US00RE44135E

(19) United States
(12) Reissued Patent
Kobayashi

(10) Patent Number: US RE44,135 E
(45) Date of Reissued Patent: Apr. 9, 2013

(54) MEDIA STORAGE APPARATUS AND IMAGE FORMING APPARATUS CONFIGURED TO OPERATE WITH REGULAR-SIZED RECORDING MEDIA AND IRREGULAR-SIZED RECORDING MEDIA

(75) Inventor: Takashi Kobayashi, Tokyo (JP)

(73) Assignee: Oki Data Corporation, Tokyo (JP)

(21) Appl. No.: 13/448,426

(22) Filed: Apr. 17, 2012

Related U.S. Patent Documents

Reissue of:
(64) Patent No.: 8,045,216
Issued: Oct. 25, 2011
Appl. No.: 11/674,322
Filed: Feb. 13, 2007

(30) Foreign Application Priority Data

Feb. 21, 2006 (JP) ..... 2006-043747

(51) Int. Cl.
*G06K 1/06* (2006.01)
*G06K 1/00* (2006.01)
*B65H 1/00* (2006.01)
*B65H 1/12* (2006.01)

(52) U.S. Cl. ..... 358/1.2; 358/496; 358/1.9; 271/171

(58) Field of Classification Search ..... 358/1.1, 358/1.2, 1.9, 498; 271/171; 399/121, 122, 399/222

See application file for complete search history.

(56) References Cited

U.S. PATENT DOCUMENTS

| | | | |
|---|---|---|---|
| 2003/0227127 | A1 | 12/2003 | Chang |
| 2004/0070138 | A1 | 4/2004 | Ishikuro |
| 2005/0133983 | A1 | 6/2005 | Jacobs et al. |
| 2005/0275149 | A1 | 12/2005 | Kim et al. |

FOREIGN PATENT DOCUMENTS

| | | |
|---|---|---|
| JP | 61-55028 | 3/1986 |
| JP | 6-24586 | 2/1994 |
| JP | 08-034525 | 2/1996 |
| JP | 9-52631 | 2/1997 |
| JP | 9-208059 | 8/1997 |
| JP | 11-139576 | 5/1999 |
| JP | 11-222321 | 8/1999 |
| JP | 2005-41646 | 2/2005 |
| JP | 2005-82377 | 3/2005 |
| JP | 2005-126150 | 5/2005 |

*Primary Examiner* — Thomas Lett
(74) *Attorney, Agent, or Firm* — Rabin & Berdo, P.C.

(57) ABSTRACT

A media storage apparatus includes a media storing body that stores recording media, a guide member slidably provided in the media storing body for guiding the recording media, a first positioning portion that positions the guide member at a predetermined position where the guide member guides regular-sized recording media, and a second positioning portion that positions the guide member at a position where the guide member guides irregular-sized recording media. The first positioning portion and the second positioning portion have different shapes.

28 Claims, 21 Drawing Sheets

MEDIA STORAGE APPARATUS AND IMAGE FORMING APPARATUS CONFIGURED TO OPERATE WITH REGULAR-SIZED RECORDING MEDIA AND IRREGULAR-SIZED RECORDING MEDIA

Matter enclosed in heavy brackets [ ] appears in the original patent but forms no part of this reissue specification; matter printed in italics indicates the additions made by reissue.

BACKGROUND OF THE INVENTION

This invention relates to an image forming apparatus such as an electrophotographic printer, a facsimile, a copier or the like. In particular, this invention relates to a media storage apparatus for storing recording media used in the image forming apparatus.

Conventionally, a sheet cassette of an image forming apparatus has a sheet guiding mechanism for guiding the sheets. The sheet guiding mechanism includes, for example, a sheet rear end guide that guides the rear end of recording media. The sheet rear end guide engages one of grooves formed at constant intervals on a bottom frame of the sheet cassette so that the position of the sheet rear end guide is determined. Such a sheet cassette is disclosed in, for example, Japanese Laid-Open Patent Publication No. 8-34525 (in particular, pages 2-3 and FIG. 1).

In the above described conventional sheet cassette, if the grooves are formed at narrow intervals, the sheet rear end guide can be fixed at a substantially arbitrary position. Therefore, the sheet rear end guide is capable of guiding various kind of irregular-sized sheets in accordance with the needs of the user, as well as regular-sized sheets such as A4, A3 or the like. However, if the intervals between the grooves become narrower, it becomes difficult to identify the best-suited fixing position. In such a case, even when the regular-sized sheets such as A4, A3 or the like are set in the sheet cassette, it is difficult to fix the sheet rear end guide at a predetermined (best-suited) fixing position.

SUMMARY OF THE INVENTION

An object of the present invention is to provide a media storage apparatus and an image forming apparatus in which a guide member can be easily positioned when regular-sized recording media (A4 size, A3 size or the like) are set, and in which the guide member can be used to guide irregular-sized recording media.

The present invention provides a media storage apparatus including a media storing body that stores recording media, a guide member slidably provided in the media storing body and guiding the recording media, a first positioning portion that positions the guide member at a predetermined position where the guide member guides regular-sized recording media, and a second positioning portion that positions the guide member at a position where the guide member guides irregular-sized recording media. The first positioning portion and the second positioning portion have different shapes.

The present invention also provides a media storage apparatus including a media storing body that stores recording media, a guide member slidably provided in the media storing body and guiding the recording media, a first positioning portion that positions the guide member at a predetermined position where the guide member guides regular-sized recording media, and a second positioning portion that positions the guide member at a position where the guide member guides irregular-sized recording media. The guide member includes a first claw portion that engages the first positioning portion, a second claw portion that engages the second positioning portion, and a switching mechanism that selectively causes one of the first and second claw portions to engage corresponding one of the first and second positioning portions.

The present invention also provides an image forming apparatus including the above described media storage apparatus, an image forming portion that forms a developer image, a transferring portion that transfers the developer image to a recording medium fed from the media storing portion, a fixing portion that fixes the developer image to the recording medium.

With such an arrangement, the guide member can be easily positioned when the regular-sized recording media are set in the media storing body, and the guide member can be positioned with a high positioning accuracy when the irregular-sized recording media are set in the media storing body.

BRIEF DESCRIPTION OF THE DRAWINGS

In the attached drawings:

FIG. 21A shows the state where a movable member is at a neutral position, FIG. 21B shows the state where a claw portion protrudes downward to become engagable with one of second grooves, and FIG. 21C shows the state where another claw portion protrudes downward to become engagable with one of first grooves.

DETAILED DESCRIPTION OF THE PREFERRED EMBODIMENT

Embodiments of the present invention will be described with reference to the attached drawings.

Embodiment 1

Figure 1:
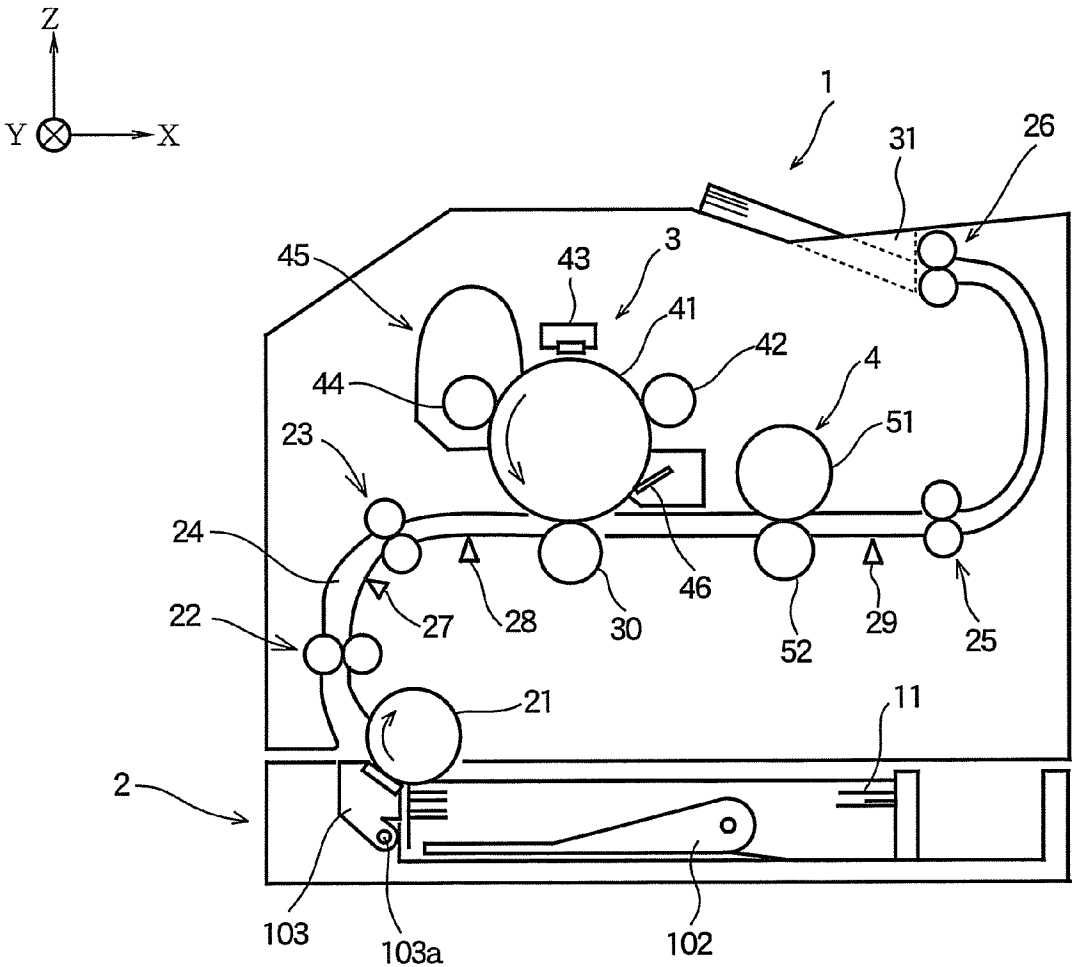
FIG. 1 is a schematic view showing a configuration of a main part of an image forming apparatus according to Embodiment 1 of the present invention.

FIG. 1 is a schematic view showing a configuration of a main part of an image forming apparatus according to Embodiment 1 of the present invention.

In FIG. 1, an image forming apparatus 1 of Embodiment 1 has a configuration of, for example, an electrophotographic printer. As shown in FIG. 1, a media cassette 2 for storing recording media 11 are detachably attached to a main body of the image forming apparatus 1. The recording media 11 are stacked and set in the media cassette 2. The detail of the media cassette 2 will be described later. A supply roller 21 is provided in the image forming apparatus 1. The supply roller 21 cooperates with a separation frame 103 of the media cassette 2 to separately supply a recording medium 11 (from the recording media 11 stored in the media cassette 2) one by one. Feeding rollers 22, registration rollers 23 and eject rollers 25 and 26 are provided in the image forming apparatus 1, for feeding the recording medium 11 along a feeding path 24. An entering sensor 27, a passage sensor 28 and an ejection sensor 29 are provided in the image forming apparatus 1, for detecting the position of the recording medium 11 fed along the feeding path 24. An eject stacker 31 is provided on the image forming apparatus 1, which holds the ejected recording media 11. An image forming portion 3 is provided in the image forming apparatus 1, which forms a toner image (i.e., a developer image). A transfer roller 30 is provided in the image forming apparatus 1, which transfers the toner image to the recording medium 11. A fixing unit 4 is provided in the image forming apparatus 1, which fixes the toner image (having been transferred to the recording medium 11) to the recording medium 11.

An image forming portion 3 for forming the toner image includes a photosensitive drum 41 for bearing the toner image, a charging roller 42 that uniformly charges the surface of the photosensitive drum 41, an exposing head 43 composed of LED array that form a latent image on the surface of the photosensitive drum 41, a developing unit 45 that stores toner (developer) and forms the toner image on the latent image using a developing roller 45, and a cleaning blade 46 that scrapes off the toner from the surface of the photosensitive drum 41 after the toner image is transferred to the recording medium 11.

The fixing unit 4 includes a pair or rollers, i.e., a heat roller 51 having an internal heat source such as a halogen lamp (not shown) and a backup roller 52. The fixing unit 4 applies heat and pressure to the toner image on the recording medium 11 fed from the image forming portion 3 and the transfer roller 30 so that the toner image is molten and fixed to the recording medium 11.

FIG. 1 shows XYZ-coordinate. X-axis is defined in a feeding direction of the recording medium 11 when the recording medium 11 passes the image forming portion 3. Y-axis is defined in a direction of a rotation axis of the photosensitive drum 41. Z-axis is defined in a direction perpendicular to the X-axis and the Y-axis. When the XYZ-coordinate is shown in other drawings, the X-axis, the Y-axis and the Z-axis respectively show the same direction as those shown in FIG. 1. In other words, the X-axis, the Y-axis and the Z-axis of the respective drawings indicate the direction of respective parts when the parts constitute the image forming apparatus 1 shown in FIG. 1.

Next, the printing operation of the image forming apparatus 1 will be described. The recording media 11 set in the media cassette 2 are pressed by the supply roller 21 rotating in the direction shown by an arrow. The recording medium 11 is fed out of a placing plate 102, and is fed into the feeding path 24 one by one by the cooperation of the separation frame 103 (pushed by a not shown pushing unit clockwise about a shaft 103a) and the supply roller 21. Further, the recording medium 11 is fed by the feeding rollers 22 and reaches the detecting position of the entering sensor 27. In synchronization with the detection of the passage of the recording medium 11 by the entering sensor 27, the registration rollers 23 start rotating. The skew of the recording medium 11 is corrected by the registration rollers 23, and then the recording medium 11 reaches the detecting position of the passage sensor 28. In synchronization with detection of the passage of the recording medium 11 by the passage sensor 28, the image forming portion 3 starts forming the toner image. The toner image formed on the surface of the photosensitive drum 41 is transferred to the recording medium 11 (having been fed) by the transfer roller 30.

The image forming portion 3 forms the toner image as follows. First, the surface of the photosensitive drum 41 rotating in a direction shown by an arrow is negatively charged by the charging roller 42. When the charged surface of the photosensitive drum 41 reaches the position below the exposing head 43, the exposing head 43 performs the exposure to form the latent image on the surface of the photosensitive drum 41. The latent image is developed by the developing roller 44 in the developing unit 45, and the toner image is formed. The toner image is transferred to the recording medium 11 by the transfer roller 30. The residual toner remaining on the surface of the photosensitive drum 41 is removed by the cleaning blade 46.

The toner image (having been transferred to the recording medium 11 by the transfer roller 30) is fixed to the recording medium 11 by the fixing process at high temperature and high pressure applied by the heat roller 51 and the backup roller 52 of the fixing unit 4. The recording medium 11 to which the toner image is fixed by the fixing process is ejected by the eject rollers 25 and 26 to the eject stacker 31. The ejection of the recording medium 11 is detected by the ejection sensor 29.

Figure 2:
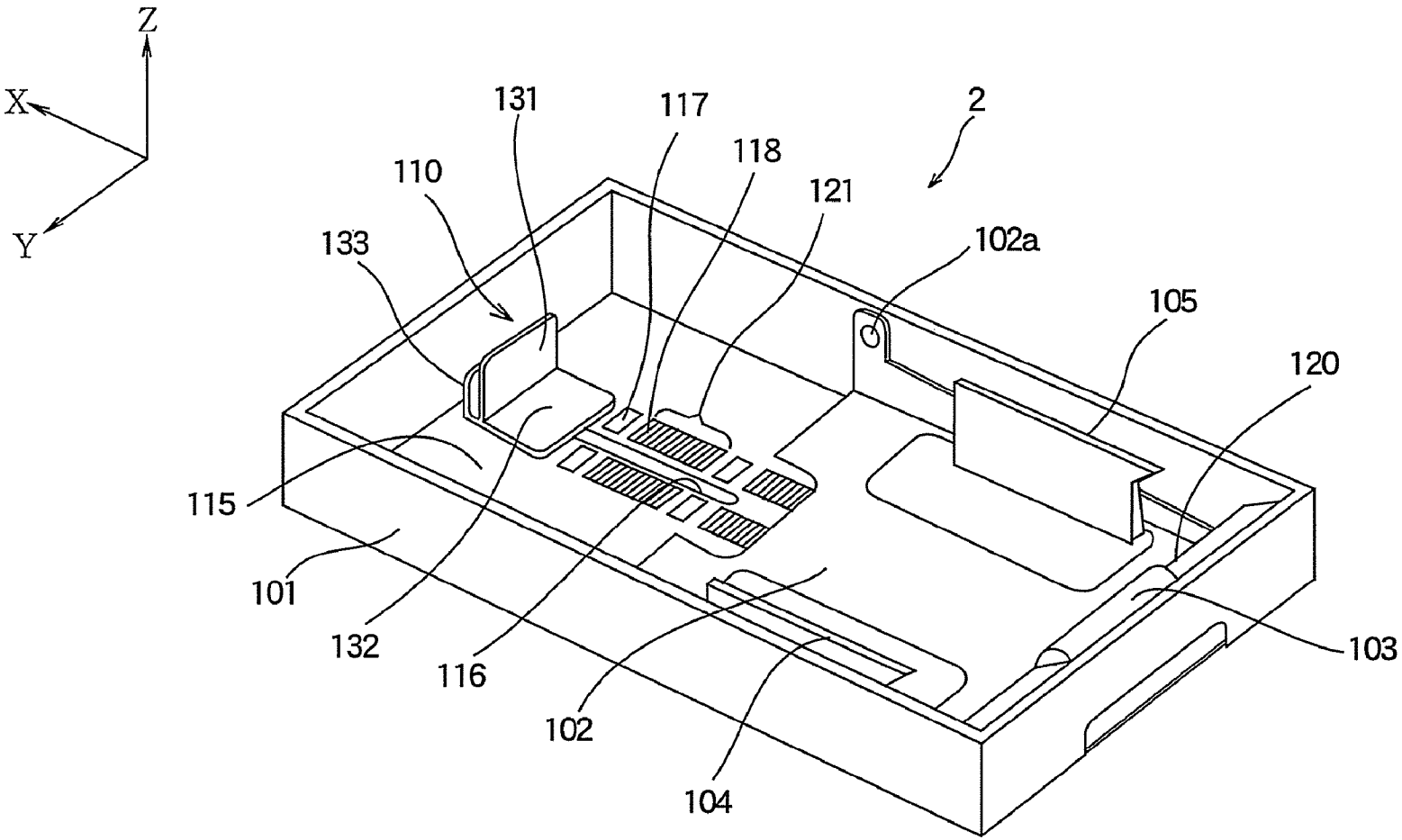
FIG. 2 is a perspective view showing a configuration of a media cassette as a media storage apparatus according to Embodiment 1 of the present invention.
Figure 3:
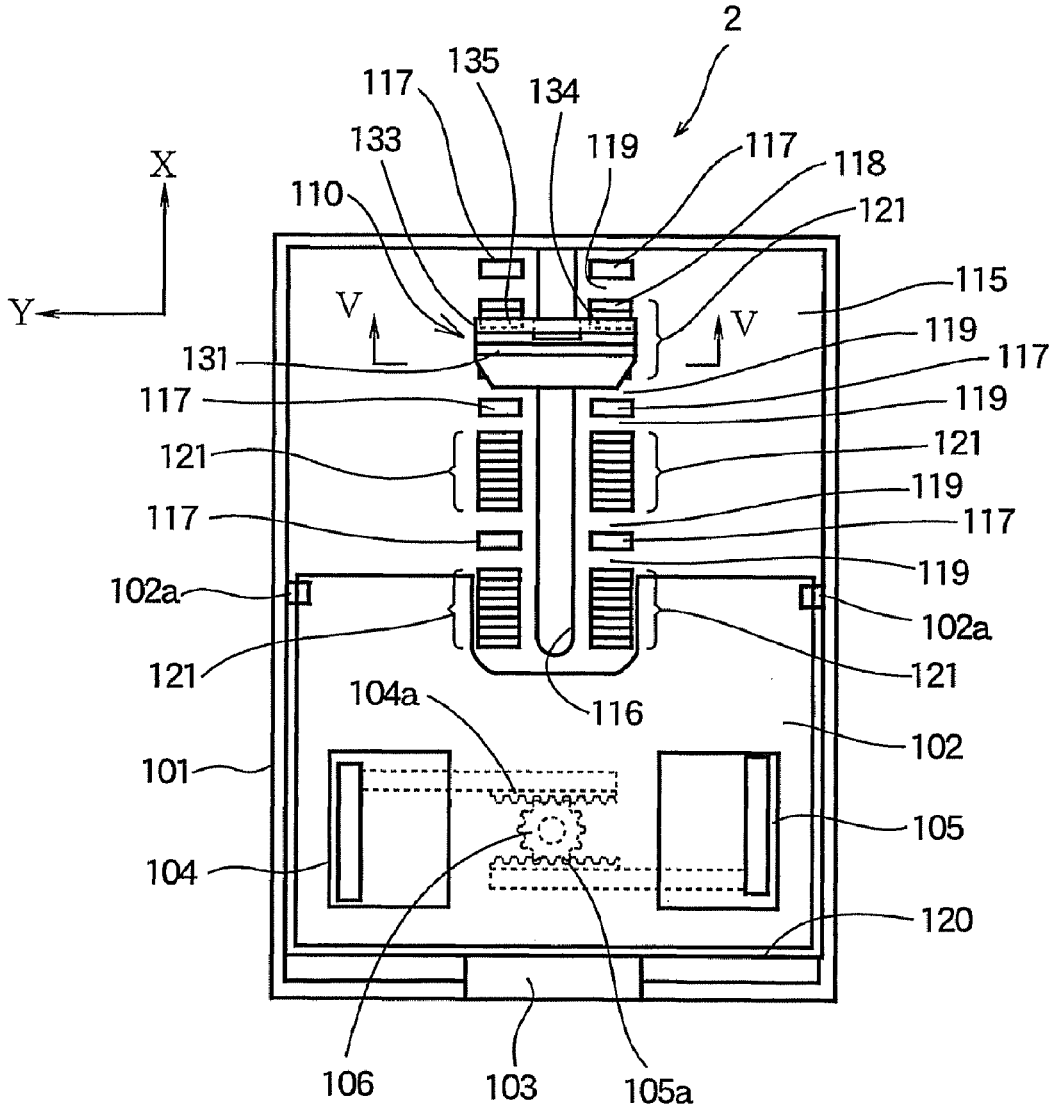
FIG. 3 is a plan view showing a configuration of the media cassette according to Embodiment 1 of the present invention.

Next, the media cassette 2 will be described. FIGS. 2 and 3 are respectively a perspective view and a plan view of the media cassette as a media storage apparatus according to Embodiment 1 of the present invention.

As shown in FIGS. 2 and 3, the media cassette 2 detachably attached to the main body of the image forming apparatus 1 includes a cassette frame 101 as a media storing body for storing the recording media 11 (FIG. 1), and a placing plate 102 supported by the cassette frame 101 so that the placing plate 102 is rotatable about an axis 102a parallel to the Y-axis. The placing plate 102 pushes the recording media 11 placed thereon against the supply roller 21 (FIG. 1) by means of a not-shown pushing unit. The media cassette 2 further includes the above described separation frame 103 and a tail guide 110 described later.

A pair of side guides 104 and 105 (as sheet guides in the widthwise direction) are disposed on the placing plate 102. The side guides 104 and 105 are supported on the placing plate 102 so that the side guides 104 and 105 are slidable in the direction of the Y-axis. As shown in FIG. 3, the side guides 104 and 105 have rack gears 104a and 105a on the backside of the placing plate 102. The rack gears 104a and 105a engage the pinion gear 106 (rotatably supported by the placing plate 102 as shown in FIG. 3) where the side guides 104 and 105 face each other. With such a configuration, the side guides 104 and 105 moves along Y-axis in directions opposite to each other and in synchronization with each other. That is, the side guides 104 and 105 moves in the widthwise direction of the recording media 11 (i.e., the direction of the Y-axis) so that the side guides 104 and 105 are distanced from the center by the same amount, so as to symmetrically guide the recording media 11 with respect to the center of the placing plate 102.

Next, the tail guide 110 and a holding mechanism thereof will be described. The tail guide 110 is provided for guiding the position of the recording media 11 set in the media cassette 2 in the longitudinal direction (i.e., the direction of the X-axis). The feeding side of the recording media 11 set in the media cassette 2 (i.e., the negative side in the direction of the X-axis) is referred to as a front side, and the opposite side is referred to as a rear side.

A movement-guide elongated hole 116 is formed on the bottom plate 115 of the cassette frame 101. The movement-guide elongated hole 116 extends from the rear end to the center in the feeding direction of the recording media 11. A plurality of first grooves 117 (i.e., positioning portions) are formed on both sides of the movement-guide elongated hole 116 in bilaterally symmetric manner. A plurality of second grooves 118 (i.e., positioning portions) are formed on both sides of the movement-guide elongated hole 116 in bilaterally symmetric manner. A side wall formed on the separation frame 103 side of the cassette frame 101 in the longitudinal direction (i.e., the direction of the X-axis) constitutes a media reference surface 120 against which the front ends of the recording media 11 (i.e., the front end of the stack of the recording media 11) abut.

The first grooves 117 are disposed at predetermined distances (described later) from the media reference surface 120. The second grooves 118 are formed at predetermined intervals to constitute groove-arrays 121 so that flat portions 119 lie between the groove-arrays 121 and the first grooves 117. The opening area of each first groove 117 is larger than the opening area of each second groove 118, and the depth of each first groove 117 is deeper than the depth of each second groove 118, so that claw portions 134 and 135 (FIG. 4) of the tail guide 110 can enter into the first groove 117 more deeply as described later.

Figure 4A:
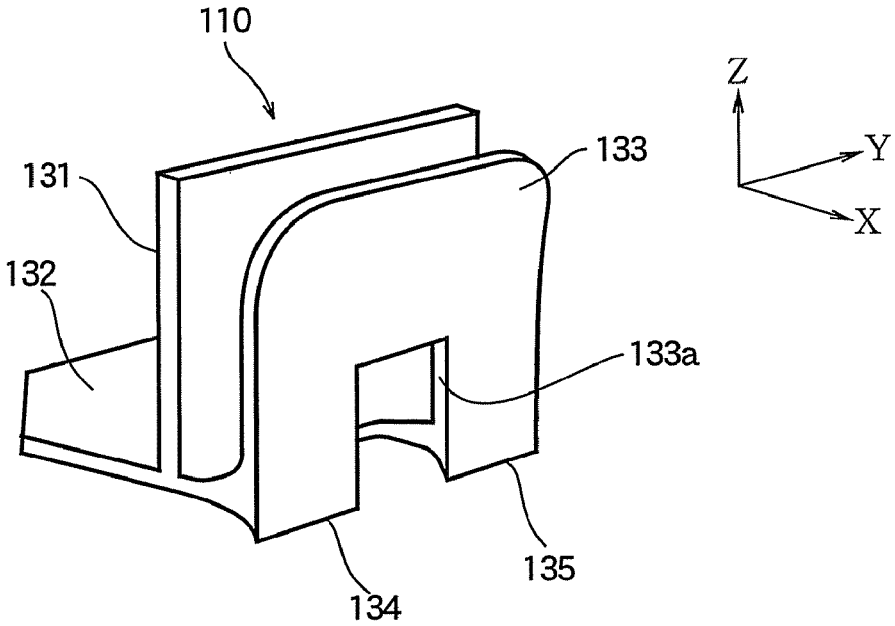
FIG. 4A is a perspective view showing an external shape of a tail guide according to Embodiment 1 of the present invention.
Figure 4B:
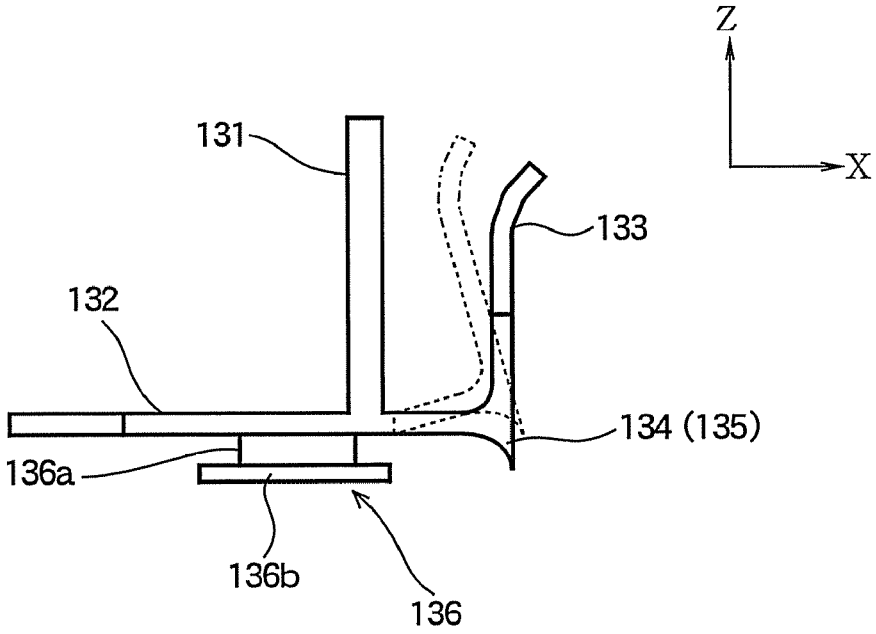
FIG. 4B is a side view showing the tail guide according to Embodiment 1 of the present invention.
Figure 5:
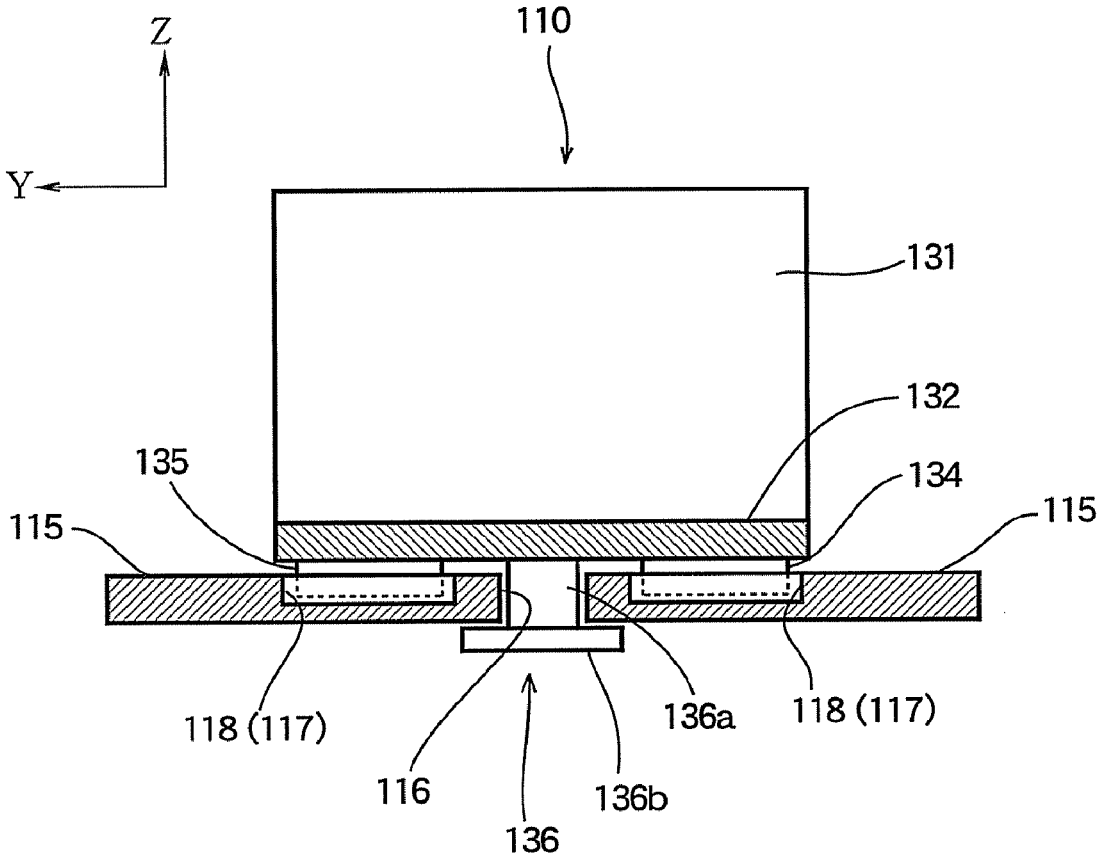
FIG. 5 is a sectional view schematically showing the media cassette taken along line V-V shown in FIG. 3.

FIG. 4A is a perspective view showing an external shape of the tail guide 110. FIG. 4B is a side view showing the tail guide 110. FIG. 5 is a sectional view schematically showing the media cassette 2 taken along a line V-V shown in FIG. 3.

As shown in FIG. 4A, the tail guide 110 includes a flat plate portion 132 on which the rear ends of the recording media 11 are placed facing the bottom plate 115 (FIG. 2) of the cassette frame 101, a media regulating plate 131 provided upright on the flat plate portion 132 so as to face the rear ends of the recording media 11, a lock lever 133 with a parting portion 133a, and claw portions 134 and 135 protrude downward from both sides of the parting portion 133a of the lock lever 133 to positions lower than the flat plate portion 132. A suspended portion 136 is formed below the flat plate portion 132. As shown in FIG. 5, the suspended portion 136 protrude downward from the bottom surface of the flat plate portion 132, and includes a guide convex 136a guided by the movement-guide elongated hole 116 of the cassette frame 101, and a bottom plate 136b formed continuously from the guide convex 136a for preventing the tail guide 110 from dropping out of the movement-guide elongated hole 116.

With such a configuration, the tail guide 110 is guided by the movement-guide elongated hole 116 and becomes slidably movable in the longitudinal direction thereof (i.e., the direction of X-axis). In this state, as shown in FIGS. 3 and 5, the claw portions 134 and 135 of the lock lever 133 engage the first grooves 117 or the second grooves 118 formed on the cassette frame 101, and are fixed at the engaging positions. Therefore, in order to move the tail guide 110, it is necessary to disengage the claw portions 134 and 135 from the first grooves 117 or the second grooves 118 by slightly lifting up the tail guide 110, or by pinching the lock lever 133 to inflect the lock lever 133 as shown by dashed line in FIG. 4B.

In this Embodiment, as shown in FIG. 3, the first grooves 117, the second grooves 118 and the flat portions 119 are arranged in the form of two arrays on both sides of the movement-guide elongated hole 116, and engage two claw portions 134 and 135 of the tail guide 110. Since the tail guide 110 is fixed on both (bilateral) sides of the movement-guide elongated hole 16, the tail guide 100 can be stably fixed.

The positions of the first grooves 117 are so determined that the distance from the medium reference surface 120 to the medium regulation plate 131 of the tail guide 110 is, for example, the same as or slightly longer than the longer sides of the regular-sized recording media 11 (i.e., A3, A4, A5, B5 or the like of Japan Industrial Standard) so that the regular-sized recording media 11 can be suitably set, when the claw portions 134 and 135 of the tail guide 110 engage the first grooves 117 and are locked by the first grooves 117. In the groove-arrays 121, the second grooves 118 are formed at narrower pitches than the first grooves 117, so that the second grooves 118 can be used for the irregular-sized recording media 11.

Next, the operation of the tail guide 110 in the case of setting the recording media 11 in the media cassette 2 will be described with reference to FIGS. 3 through 6.

In the case of setting the regular-sized recording media 11, the recording media 11 are stored in such a manner that the front ends of the recording media 11 abut against the media reference surface 120 (FIG. 3). In this state, the recording media 11 are guided by the side guides 104 and 105 in the widthwise direction, and the recording media 11 are guided in a symmetrical manner with respect to the center in the widthwise direction (i.e., the direction of the Y-axis). Then, the tail guide 110 is moved to the position where the media regulating plate 131 of the tail guide 110 abuts against the rear ends of the recording media 11. In this state, the claw portions 134 and 135 (FIG. 5) of the tail guide 110 engage the first grooves 117 formed on the cassette frame 101 so that the tail guide 110 is fixed.

As an alternative method, it is also possible to push the rear ends of the recording media 11 by the tail guide 110 to the position where the front ends of the recording media 11 abut against the media reference surface 120. In this case, the tail guide 110 is fixed at the position where the front ends of the recording media 11 abut against the media reference surface 120. As another alternative method, it is also possible to previously fix the tail guide 110 at a fixing position corresponding to the regular-sized recording media 11, and then set the recording media 11 to a position defined between the media reference surface 120 and the tail guide 110.

Figure 6A:
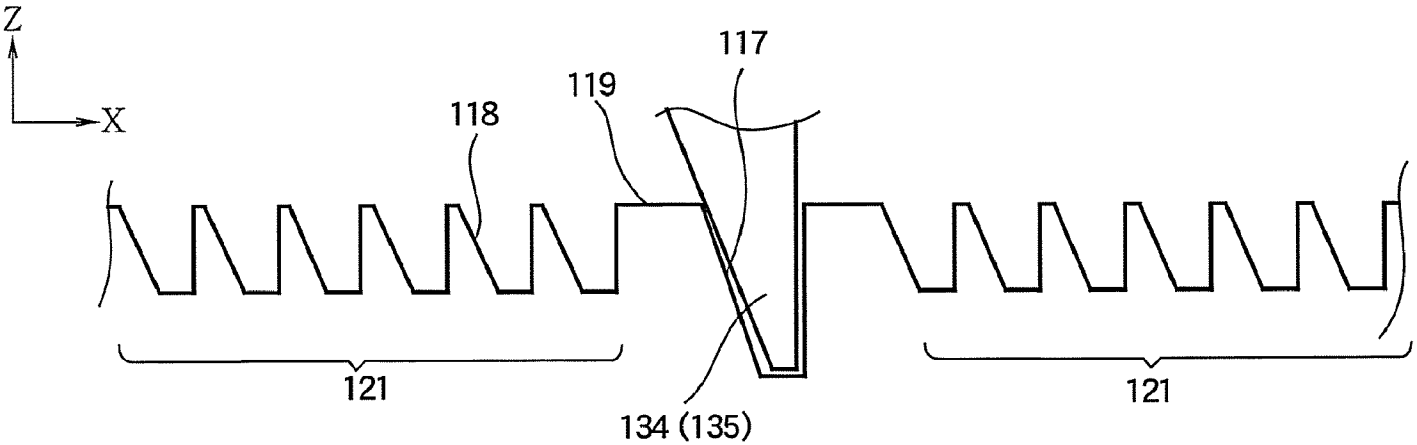
FIG. 6A shows a relationship among a claw portion, a first groove and a second groove when regular-sized recording media are set in the media cassette.

FIG. 6A shows the relationship among the claw portions 134 and 135, the first grooves 117 and the second grooves 118 in this state. As shown in FIG. 6A, the first grooves 117 engaging the claw portions 134 and 135 are deeper than the second grooves 118, and the flat portion 119 function as free areas in which the tail guide 110 can not be fixed. Therefore, it is easy to confirm that the tail guide 110 is fixed at the fixing position suitable for the regular-sized recording media 11. As shown in FIG. 6A, the width 119a of the flat portion 119 is wider than a width 118a of a portion between edges of the adjacent second grooves 118.

Figure 6B:
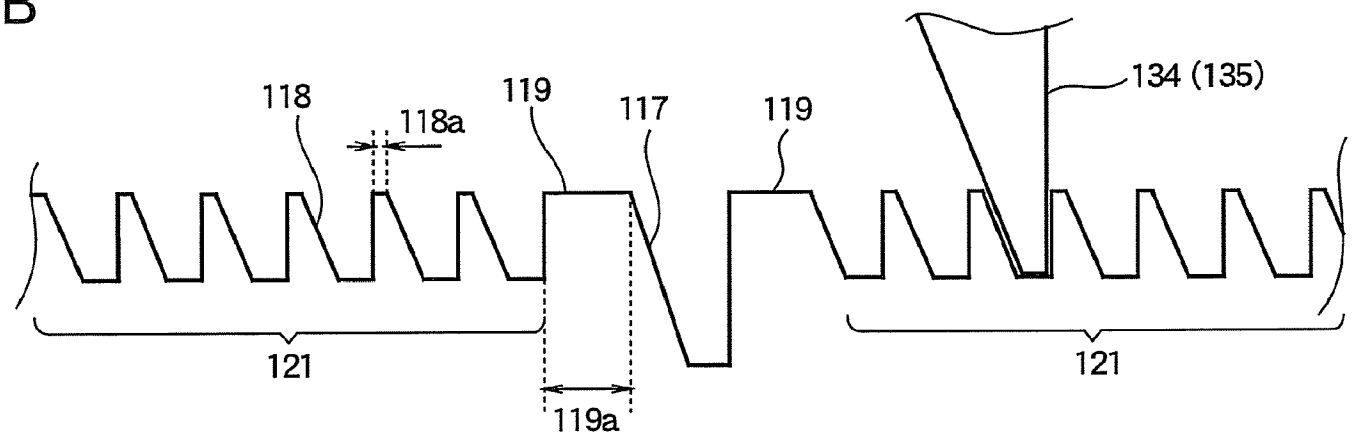
FIG. 6B shows a relationship among the claw portion, the first groove and the second groove when irregular-sized recording media are set in the media cassette.

In the case of setting the irregular-sized recording media 11, the recording media 11 are stored in such a manner that the front ends of the recording media 11 abut against the media reference surface 120 (FIG. 3), as is the case with the regular-sized recording media 11. Then, the tail guide 110 is moved to the position (i.e., the contact position) where the media regulating plate 131 of the tail guide 110 abuts against the rear ends of the recording media 11, and the tail guide 110 is fixed at the closest position from the contact position. FIG. 6B shows the relationship among the claw portions 134 and 135, the first grooves 117 and the second grooves 118 in this state. For the irregular-sized recording media 11, the claw portions 134 and 135 engage the second grooves 118 of the groove-arrays 121 formed at narrow pitches, and therefore the accuracy in the fixing position can be enhanced.

Figure 7:
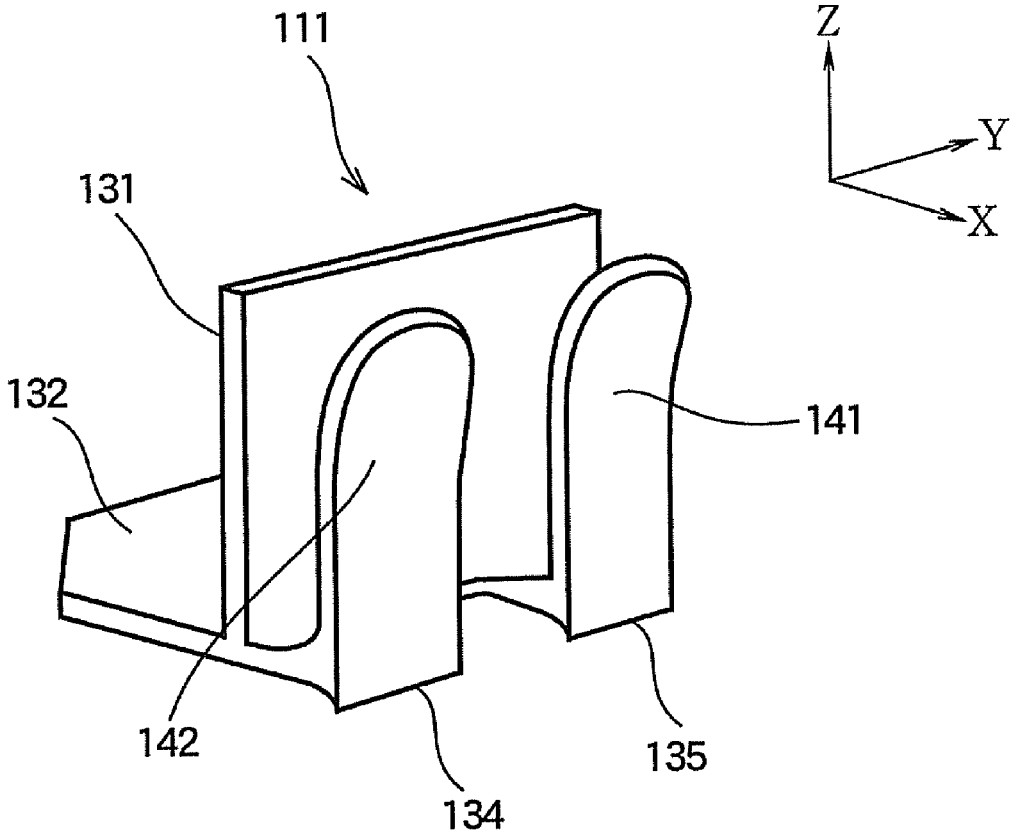
FIG. 7 shows another configuration example of the tail guide according to Embodiment 1 of the present invention.

FIG. 7 shows another configuration example of the tail guide 110. In a tail guide 111 shown in FIG. 7, the claw portions 134 and 135 are formed on lock levers 141 and 142 formed separately from each other. It is also possible to employ the tail guide 111 having the structure shown in FIG. 7 instead of the above described tail guide 110.

In this Embodiment 1, the first grooves 117, the second grooves 118 and the flat portions 119 are arranged in the form of two arrays on both sides of the movement-guide elongated hole 116. However, it is also possible to provide only one array of grooves. In such a case, the claw portion of the tail guide 110 engages only one engaging portion (groove), and therefore the confirmation of the engagement becomes easier and the operability can be enhanced.

As described above, according to Embodiment 1, during the setting of the regular-sized recording media, the tail guide defining the rear end of the recording media in the feeding direction can be positioned with a high positioning accuracy. Further, the free areas are provided ahead of and behind the first grooves (for the regular-sized recording media), and the first grooves are deeper than the second grooves for the irregular-sized recording media, with the result that it becomes easy to confirm the tail guide being fixed at the position for the regular-sized recording media. Moreover, during the setting of the irregular-sized recording media, the tail guide can be positioned with a high positioning accuracy.

Embodiment 2

Figure 8:
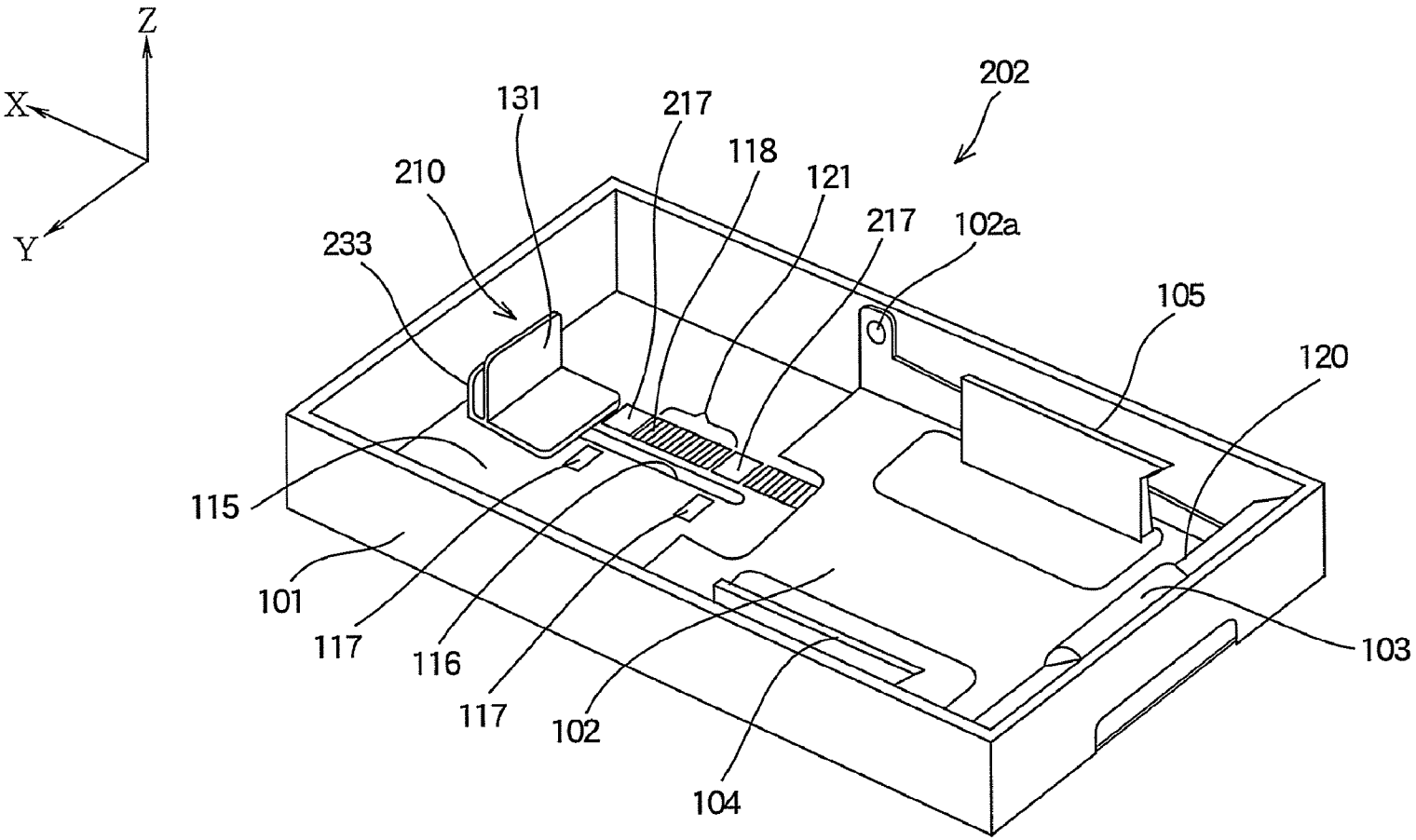
FIG. 8 is a perspective view showing a configuration of a media cassette as a media storage apparatus according to Embodiment 2 of the present invention.
Figure 9:
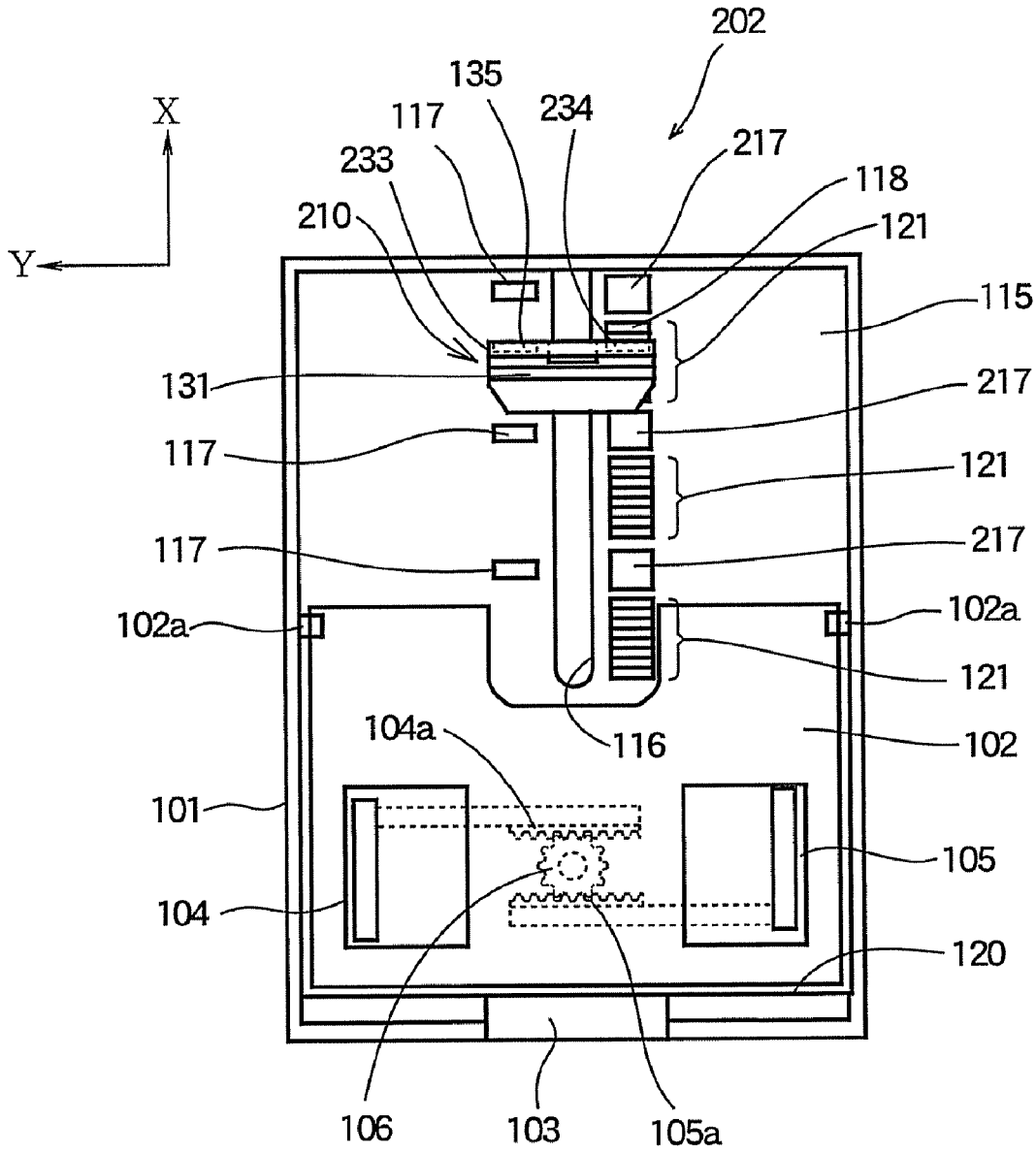
FIG. 9 is a plan view showing a configuration of a tail guide according to Embodiment 2 of the present invention.

FIGS. 8 and 9 are a perspective view and a plan view showing a configuration of a media cassette as a media storage apparatus according to Embodiment 2 of the present invention.

The media cassette 202 according to Embodiment 2 is mainly different from the above described media cassette 2 according to Embodiment 1 (FIG. 2) in the shapes of the grooves formed on the bottom plate 115 and the claw portions of a tail guide 210 (in contrast with the tail guide 110 in Embodiment 1) that engage the grooves. Elements of the media cassette 202 that are the same as those of the media cassette 2 are assigned the same reference numerals, and duplicate explanation will be omitted. The description will be emphasized on the difference between the media cassette 202 and the media cassette 2. The main body of the image forming apparatus to which the media cassette 202 is attached is the same as the main body (i.e., except the media cassette 2) of the image forming apparatus 1 shown in FIG. 1, and therefore duplicate explanation will be omitted.

As shown in FIGS. 8 and 9, the media cassette 202 detachably attached to the image forming apparatus 1 includes a cassette frame 101 for storing the recording media 11 (FIG. 1), a placing plate 102 supported by the cassette frame 101 and rotatable about an axis 102a in the direction of the Y-axis, a separation frame 103 having the above described structure, and the tail guide 210 described later.

A pair of side guides 104 and 105 (as sheet guides in the widthwise direction) are disposed on the placing plate 102 for setting the recording media 11. The side guides 104 and 105 are supported on the placing plate 102 so that the side guides 104 and 105 are slidable in the direction of the Y-axis. As shown in FIG. 9, the side guides 104 and 105 have rack gears 104a and 105a at the backside of the placing plate 102 that engage the pinion gear 106 (rotatably formed by the placing plate 102) where the side guides 104 and 105 face each other. With such a configuration, the side guides 104 and 105 moves in directions opposite to each other along the Y-axis and in synchronization with each other, so as to symmetrically guide the recording media 11 with respect to the center of the placing plate 102 in the widthwise direction (i.e., the direction of the Y-axis).

Next, the tail guide 210 and a holding mechanism thereof will be described. The tail guide 210 is provided for guiding the position of the recording media 11 set in the media cassette 202 in the longitudinal direction (i.e., the direction of the X-axis).

A movement-guide elongated hole 116 is formed on the bottom plate 115 of the cassette frame 101, and extends from the rear end to the center in the feeding direction of the recording media 11. First grooves 117, second grooves 118 and third grooves 217 (as engaging grooves) are formed on the bottom plate 115. The first grooves 117, the second grooves 118 and the third grooves 217 have different shapes. The first grooves 117 are formed on one side of the movement-guide elongated hole 116. The second grooves 118 and the third grooves 217 are formed on the other side of the movement-guide elongated hole 116. The shapes of the first grooves 117 and the second grooves 118 are as described in Embodiment 1. As shown in FIG. 11 (described later), the opening area of each first groove 117 is larger than the opening area of each second groove 118, and the depth of each first groove 117 is deeper than the depth of each second groove 118. The depth of each third groove 217 is substantially the same as the depth of each second groove 118, and the width of each third groove 217 is substantially the same as or wider than the width of each first groove 117.

A side wall formed on the separation frame 103 side of the cassette frame 101 in the longitudinal direction (i.e., the direction of the X-axis) constitutes a media reference surface 120 against which the front ends of the recording media 11 abut. The first grooves 117 are disposed at predetermined distances (described later) from the media reference surface 120. The third grooves 217 are formed to face the first grooves 117 via the movement-guide elongated hole 116. The second grooves 118 are continuously formed at predetermined intervals to constitute groove-arrays 121. The second grooves 118 (the groove-arrays 121) are formed on areas with no third grooves 217, and are aligned in the same array with the third grooves 217.

Figure 10:
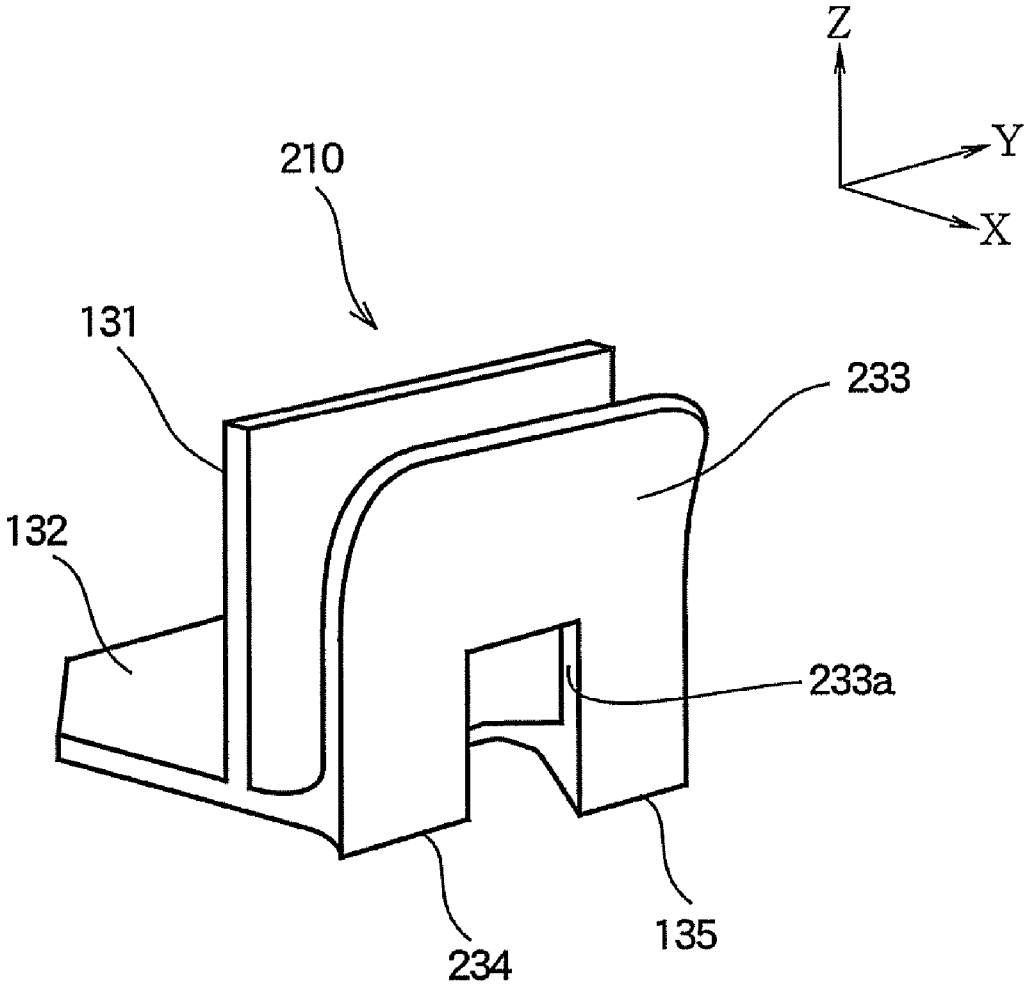
FIG. 10 is a perspective view showing an external shape of the tail guide according to Embodiment 2.

FIG. 10 is a perspective view showing the external shape of the tail guide 210. As shown in FIG. 10, the tail guide 210 includes claw portions 234 and 135 formed on the bottom of a lock lever 233. The claw portions 234 and 135 protrude downward from both sides of a parting portion 233a of the bottom of the lock lever 233 to a lower position than the flat plate portion 132. The protruding amount of the claw portion 234 is smaller than that of the protruding amount of the claw portion 135. The claw portion 234 engages the second groove 118 or the third groove 217 which are shallower than the first groove 117. The claw portion 135 engages the first groove 117 deeper than the second and third grooves. The other configuration of the tail guide 210 is the same as that of the tail guide 110 of Embodiment 1 (FIG. 4), and therefore duplicate explanation will be omitted.

The tail guide 210 is guided by the movement-guide elongated hole 116 formed on the cassette frame 101 and becomes slidably movable in the longitudinal direction thereof (i.e., the direction of X-axis) In this state, as shown in FIG. 9, the claw portion 135 of the lock lever 233 engages the first groove 117 of the cassette frame 101 and the claw portion 234 of the lock lever 233 enters into the third groove 217, or the claw portion 234 engages the second groove 118 of the cassette frame 101, so that the tail guide 210 are fixed at engaging position. Therefore, in order to move the tail guide 210, it is necessary to disengage the claw portions 234 and 135 from the respective grooves by slightly lifting up the tail guide 210, or by pinching the lock lever 233 to inflect the lock lever 233 (see FIG. 4B).

The positions of the first groove 117 are so determined that the distance from the medium reference surface 120 to the medium regulation plate 131 of the tail guide 210 is, for example, the same as or slightly longer than the longer sides of the regular-sized recording media 11 (i.e., A3, A4, A5, B5 or the like of Japan Industrial standard) so the regular-sized recording media 11 can be suitably set, in a state where the claw portion 135 of the tail guide 210 engages the first groove 117 and is locked by the first groove 117. In the groove-arrays 121, the second grooves 118 are formed at narrower pitches than the first grooves 117 so that the second grooves 118 can be used for the irregular-sized recording media.

Next, the operation of the tail guide 210 in the case of setting the recording media 11 in the media cassette 202 will be described with reference to FIGS. 9, 11 and 12.

Figure 11A:
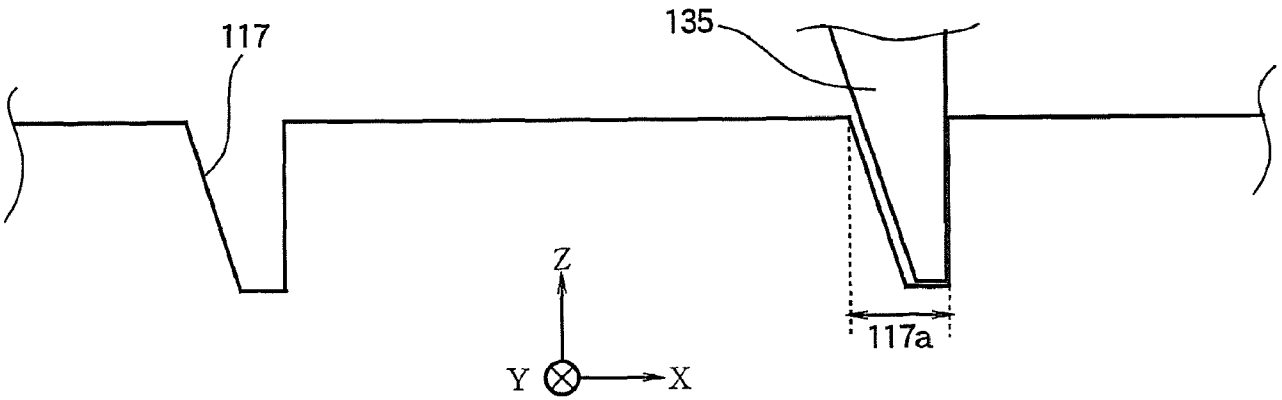
FIG. 11A shows a relationship between a claw portion and a first groove when regular-sized recording media are set in the media cassette.
Figure 11B:
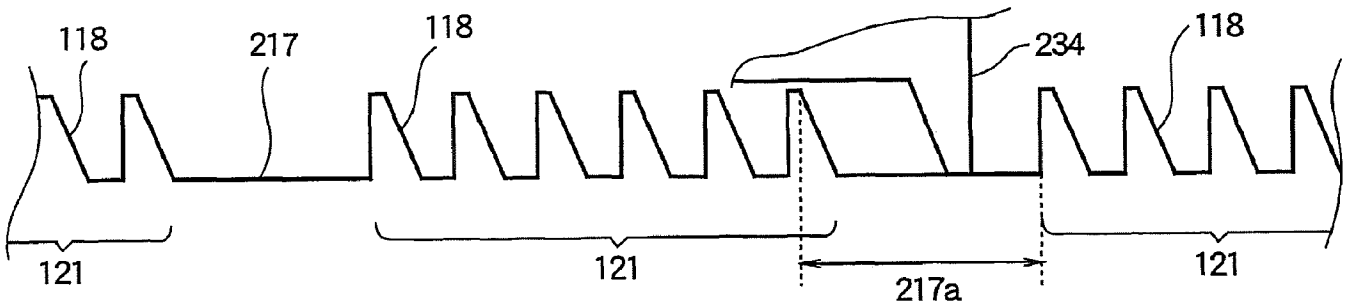
FIG. 11B shows a relationship among the claw portion, a second groove and a third groove when regular-sized recording media are set in the media cassette.
Figure 12A:
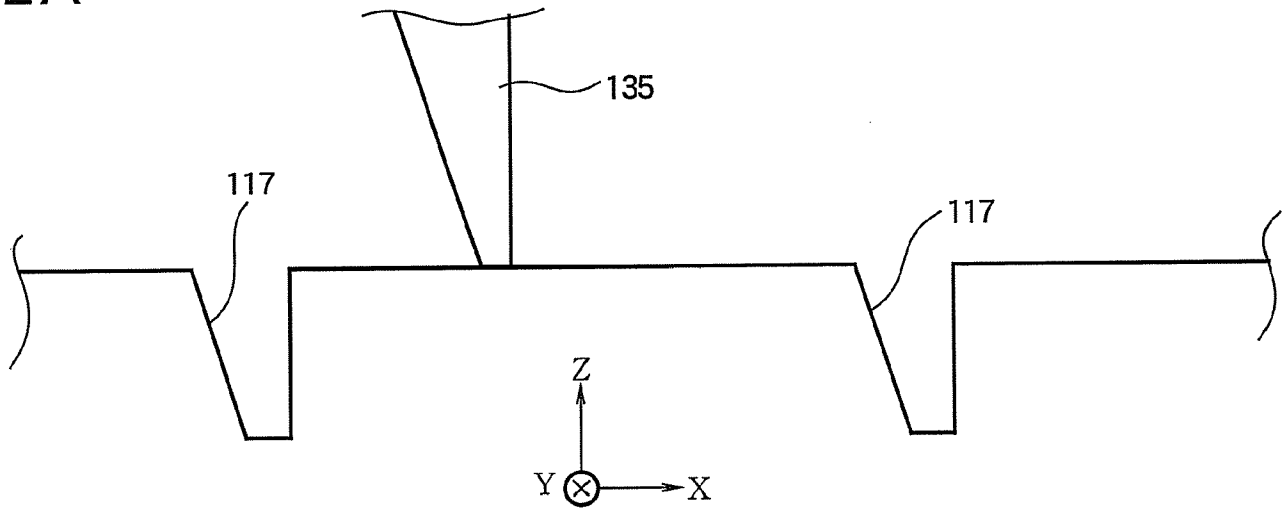
FIG. 12A shows a relationship between the claw portion and the first groove when irregular-sized recording media are set in the media cassette.
Figure 12B:
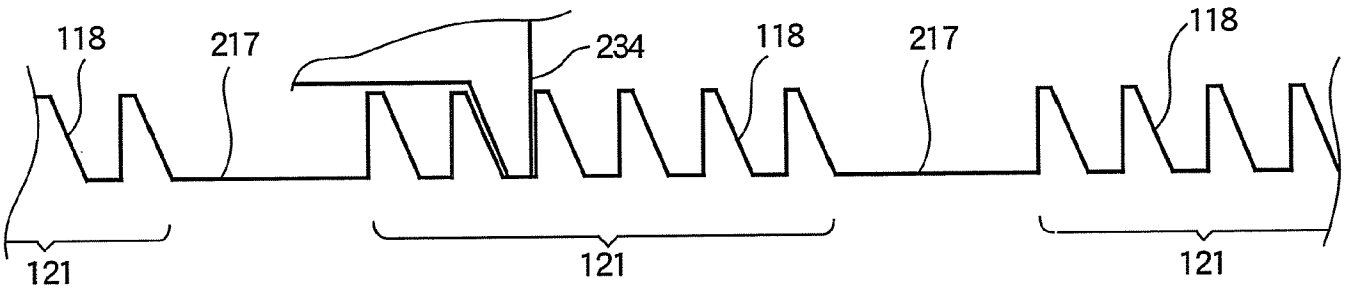
FIG. 12B shows a relationship among the claw portion, the second groove and the third groove when irregular-sized recording media are set in the media cassette.

FIG. 11A is a sectional view of a part in which the first grooves 117 are formed, as seen from the negative side in the direction of the Y-axis. FIG. 11B is a sectional view of a part in which the second grooves 118 and the third grooves 217 are formed, as seen from the negative side in the direction of the Y-axis. The respective grooves of FIGS. 11A and 11B show the respective positions in the direction of the X-axis. FIGS. 12A and 12B are illustrated in the same way as FIGS. 11A and 11B.

In the case of setting the regular-sized recording media 11, the recording media 11 are stored in such a manner that the front ends of the recording media 11 abut against the media reference surface 120 (FIG. 9). In this state, the recording media 11 are guided by the pair of side guides 104 and 105 in the widthwise direction, and the recording media 11 are guided in a symmetrical manner with respect to the center in the widthwise direction (i.e., the direction of the Y-axis). Then, the tail guide 210 is moved to the position where the media regulating plate 131 of the tail guide 210 abuts against the rear ends of the recording media 11. In this state, the claw portion 135 (FIG. 9) of the tail guide 210 engages the first groove 117 formed on the cassette frame 101 so that the tail guide 210 is fixed.

As an alternative method, it is also possible to push the rear ends of the recording media 11 by the tail guide 210 to the position where the front ends of the recording media 11 abut against the media reference surface 120. In this case, the tail guide 210 is fixed at a position where the front ends of the recording media 11 abut against the media reference surface 120. As another alternative method, it is also possible to previously fix the tail guide 210 at a fixing position corresponding to the regular-sized recording media 11, and then set the recording media 11 to the position defined between the media reference surface 120 and the tail guide 210.

FIG. 11A shows the relationship between the claw portion 135 and the first grooves 117 in this state. FIG. 11B shows the relationship among the claw portion 234, the second grooves 117 and the third grooves 217 in this state. As shown in FIGS. 11A and 11B, the claw portion 135 engages the first groove 117, and the claw portion 234 enters into the third groove 217. The width 217a of the third groove 217 is wider than the width of the upper end of the first groove 117, so that the claw portion 234 is allowed to freely move over the engaging position where the claw portion 135 engages the first groove 117 and the vicinity (frontward and rearward) of the engaging position With such a configuration, during the setting of the regular-sized recording media 11, it is only necessary that the claw portion 135 engages the first groove 117 at one position, and therefore the operability of the tail guide 210 can be enhanced.

In the case of setting the irregular-sized recording media 11, the recording media 11 are stored in such a manner that the front ends of the recording media 11 abut against the media reference surface 120 (FIG. 9), as is the case with the regular-sized recording media. Then, the tail guide 210 is moved to the position (i.e., the contact position) where the media regulating plate 131 of the tail guide 210 abuts against the rear ends of the recording media 11, and the tail guide 210 is fixed at the closest position from the contact position.

FIG. 12A shows the relationship between the claw portion 135 and the first grooves 117 in this state. FIG. 12B shows the relationship among the claw portion 234, the second grooves 118 and the third grooves 217 in this state. As shown in FIGS. 12A and 12B, the claw portion 234 engages the second grooves 118, and the claw portion 135 is in a free state. For the irregular-sized recording media 11, the claw portion 234 engages the second grooves 118 of the groove-arrays 121 formed at narrow pitches, and therefore the accuracy in the fixing position can be enhanced. Furthermore, during the setting of the irregular-sized recording media 11, it is only necessary that the claw portion 234 engages the second groove 118 at one position, and therefore the operability of the tail guide 210 can be enhanced.

Figure 13:
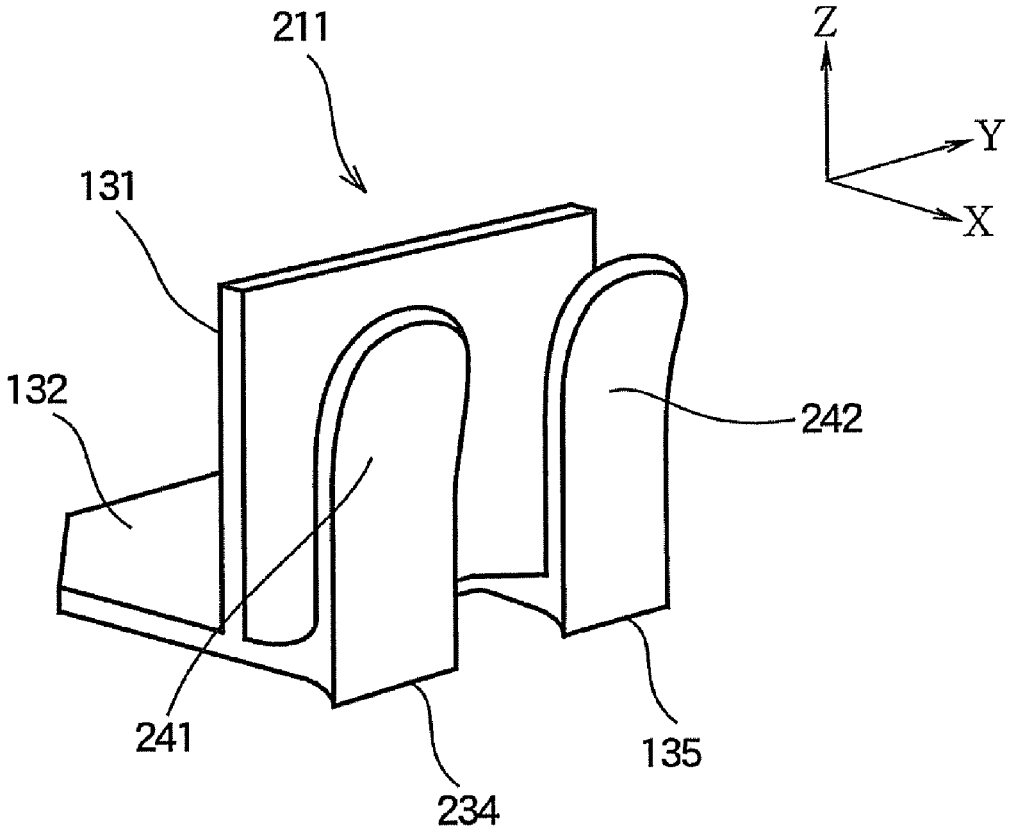
FIG. 13 shows another configuration example of the tail guide according to Embodiment 2.

FIG. 13 shows another configuration example of the tail guide 210. In a tail guide 211 shown in FIG. 13, the claw portions 234 and 135 are formed as lock levers 241 and 242 formed separately from each other. It is also possible to employ the tail guides 211 having the structure shown in FIG. 13 instead of the above described tail guide 210. By employing the tail guides 211 of such structure, the engaging operation of the claw portion 234 and the second groove 118 and the engaging operation of the claw portion 135 and the first groove 117 can be performed independently from each other.

As described above, according to Embodiment 2, the tail guide can be fixed by means of the engagement between the claw portion and the groove at one position, and therefore the operability of the tail guide can be enhanced. Further, during the setting of the regular-sized recording media, the tail guide is in the free-state at positions ahead of and behind the fixing position, and therefore it becomes easy to confirm that the tail guide being fixed at the position for the regular-sized recording media. Furthermore, during the setting of the irregular-sized recording media, the tail guide can be fixed with a high positioning accuracy.

Embodiment 3

Figure 14:
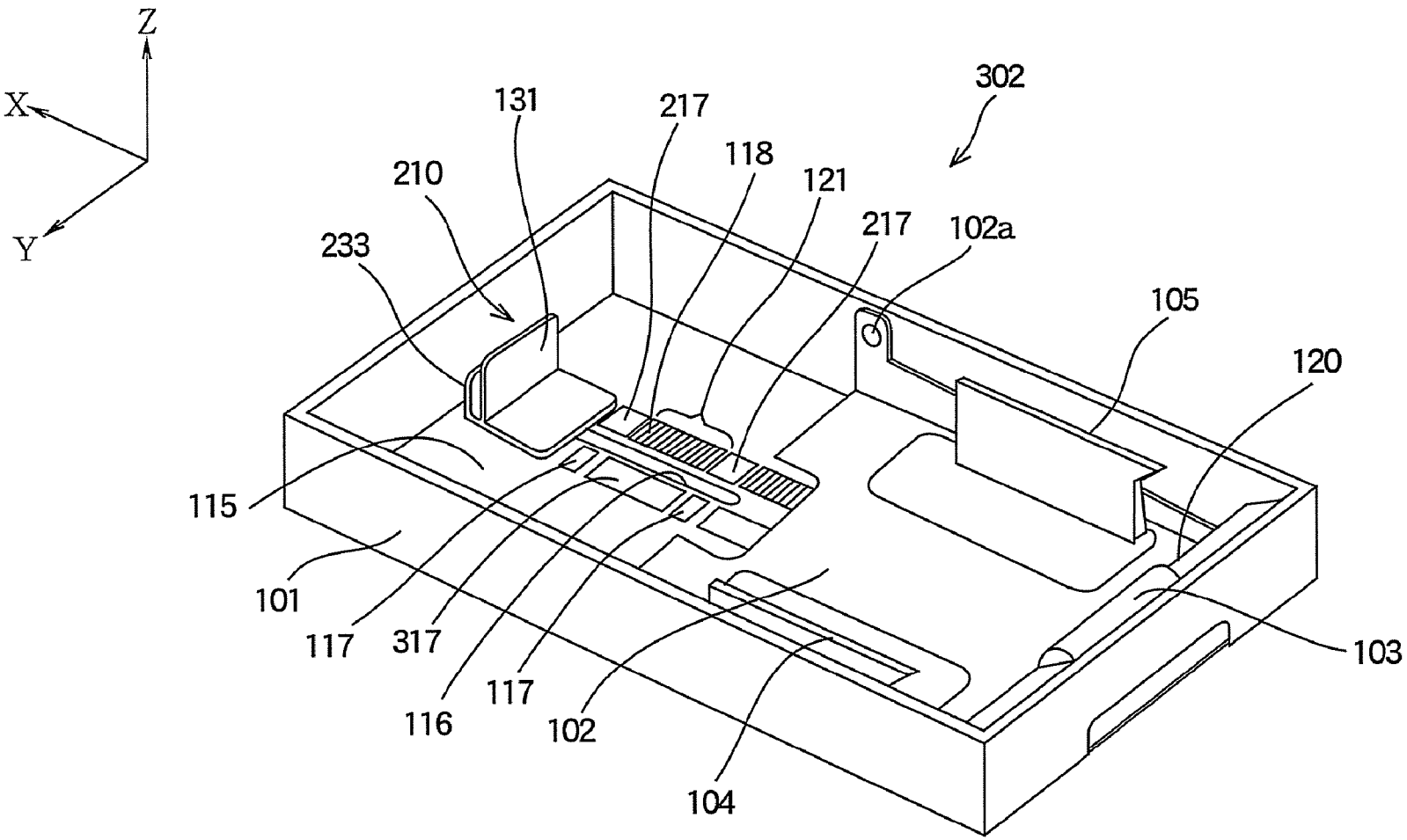
FIG. 14 is a perspective view showing a configuration of a media cassette as a media storage apparatus according to Embodiment 3 of the present invention.
Figure 15:
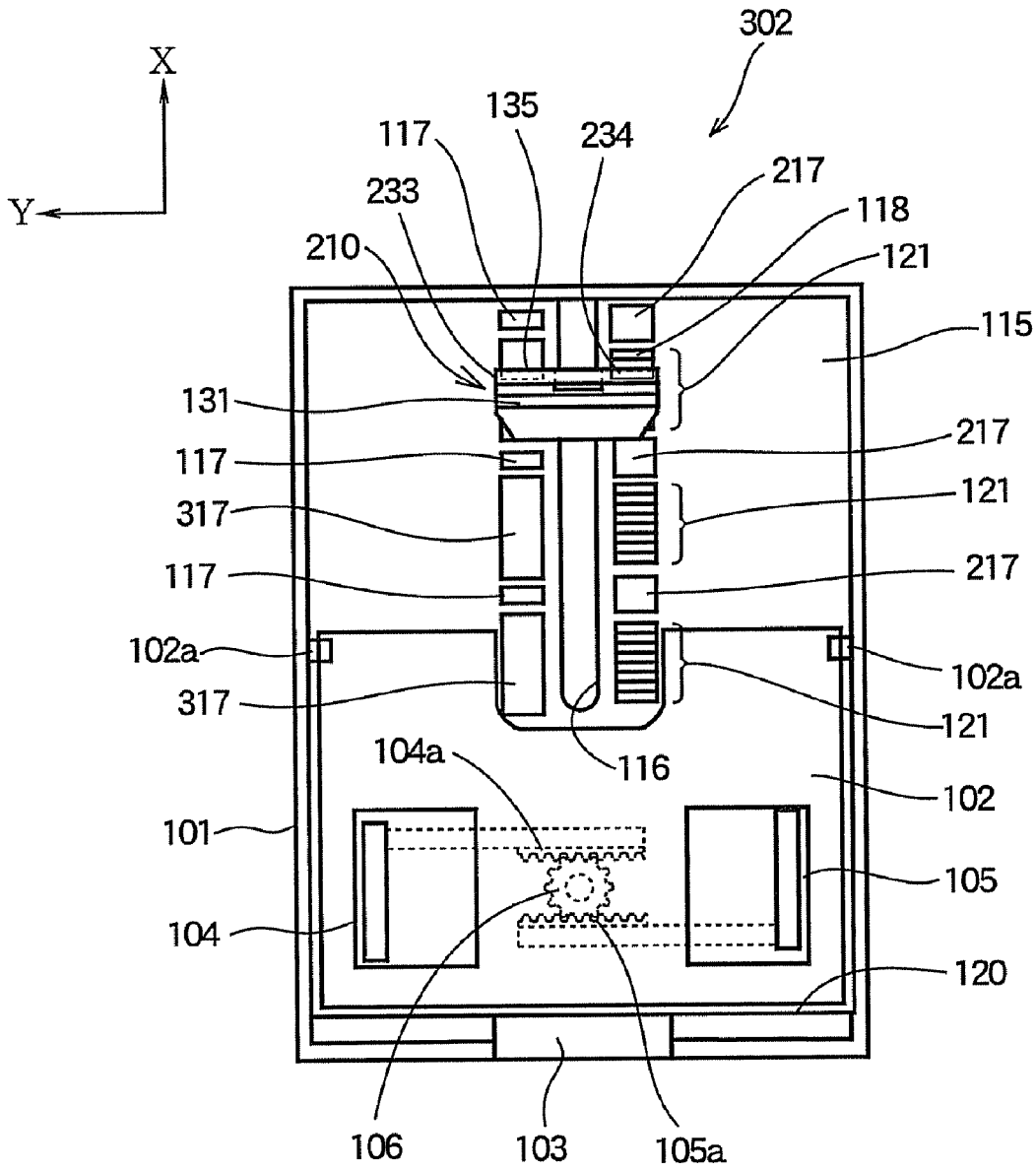
FIG. 15 is a plan view showing a configuration of the media cassette according to Embodiment 3 of the present invention.

FIGS. 14 and 15 are respectively a perspective view and a plan view showing a configuration of a media cassette as a media storage apparatus according to Embodiment 3 of the present invention.

The media cassette 302 according to Embodiment 3 is mainly different from the above described media cassette 202 according to Embodiment 2 shown in FIG. 8 in that fourth grooves 317 (engaging grooves) are formed on the bottom plate 115 and aligned in the same array as the first grooves 117. Elements of the media cassette 302 that are the same as those of the media cassette 202 are assigned the same reference numerals, and duplicate explanation will be omitted. The description will be emphasized on the difference between the media cassette 302 and the media cassette 202. The main body of the image forming apparatus to which the media cassette 302 is attached is the same as the main body (i.e., except the media cassette 2) of the image forming apparatus 1 shown in FIG. 1, and therefore duplicate explanation will be omitted.

The tail guide 210 and a holding mechanism thereof will be described. The tail guide 210 is provided for guiding the position of the recording media 11 set in the media cassette 302 in the longitudinal direction (i.e., the direction of the X-axis).

A movement-guide elongated hole 116 is formed on the bottom plate 115 of the cassette frame 101, and extends from the rear end to the center in the feeding direction of the recording media 11. First grooves 117, second grooves 118, third grooves 217 and fourth grooves 317 (as engaging grooves) are formed on the bottom plate 115. The first grooves 117, the second grooves 118, the third grooves 217 and the fourth grooves 317 have different shapes. The first grooves 117 and the fourth grooves 317 are formed on one side of the movement-guide elongated hole 116. The second grooves 118 and the third grooves 217 are formed on the other side of the movement-guide elongated hole 116. The shapes of the first grooves 117 and the second grooves 118 are as described in Embodiment 1. As shown in FIG. 16 (described later), the opening area of each first groove 117 is larger than the opening area of each second groove 118, and the depth of each first groove 117 is deeper than the depth of each second groove 118. The depth of each third groove 217 is substantially the same as the depth of each second groove 118, and the width of each third groove 217 is substantially the same as or wider than the width of each first groove 117. The depth of each fourth groove 317 is substantially the same as or deeper than the depth of each first groove 117, and the width of each fourth groove 317 is substantially the same as or wider than the width of each second groove 118 (i.e., the groove-array 121).

The positions of the first grooves 117, the second grooves 118 and the third grooves 217 are as described in Embodiment 2, and therefore duplicate explanation will be omitted. The fourth grooves 317 are formed on areas with no first grooves 117 (i.e., positions facing the groove-arrays 121 via the movement-guide elongated hole 116) and are aligned in the same array with the first grooves 117. The fourth grooves 317 have the widths substantially the same as or wider than the second grooves 181, i.e., groove-arrays 121.

Next, the operation of the tail guide 210 in the case of setting the recording media 11 in the media cassette 302 will be described with reference to FIGS. 16A through 17B.

Figure 16A:
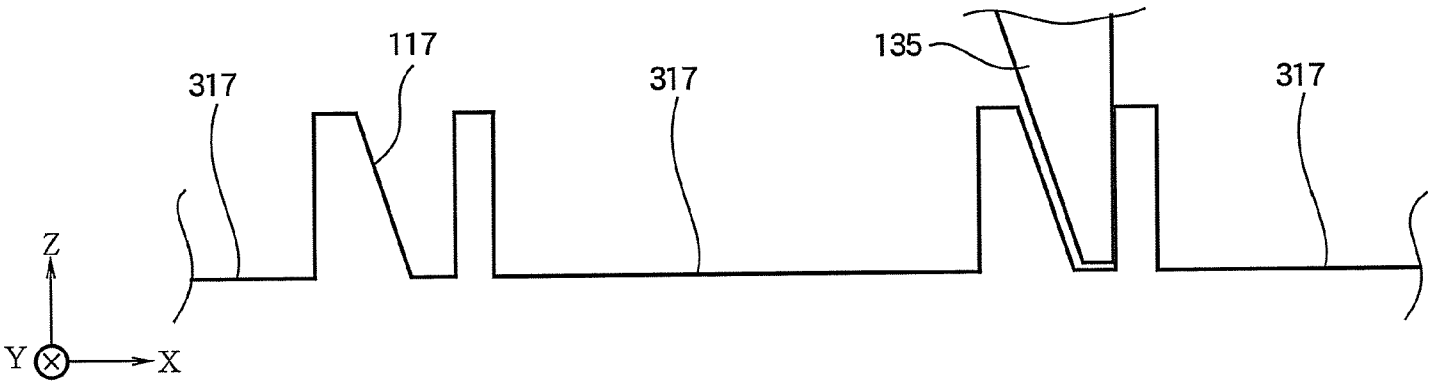
FIG. 16A shows a relationship among a claw portion, a first groove and a fourth groove when regular-sized recording media are set in the media cassette.
Figure 16B:
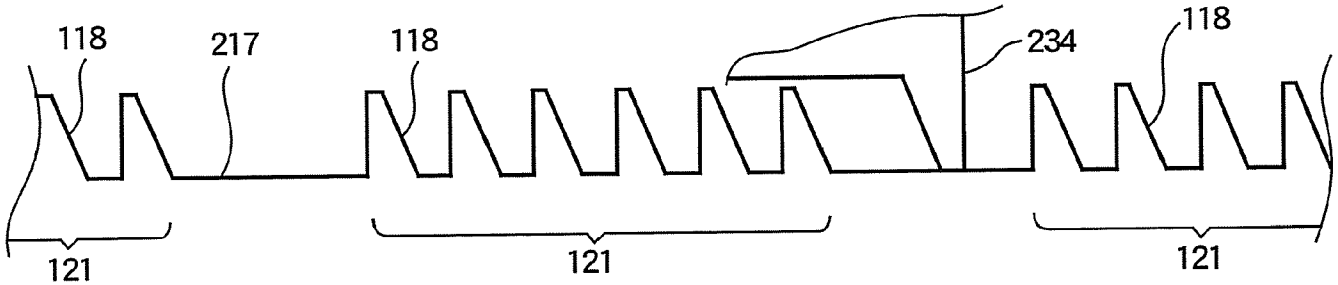
FIG. 16B shows a relationship among the claw portion, a second groove and a third groove when regular-sized recording media are set in the media cassette.
Figure 17A:
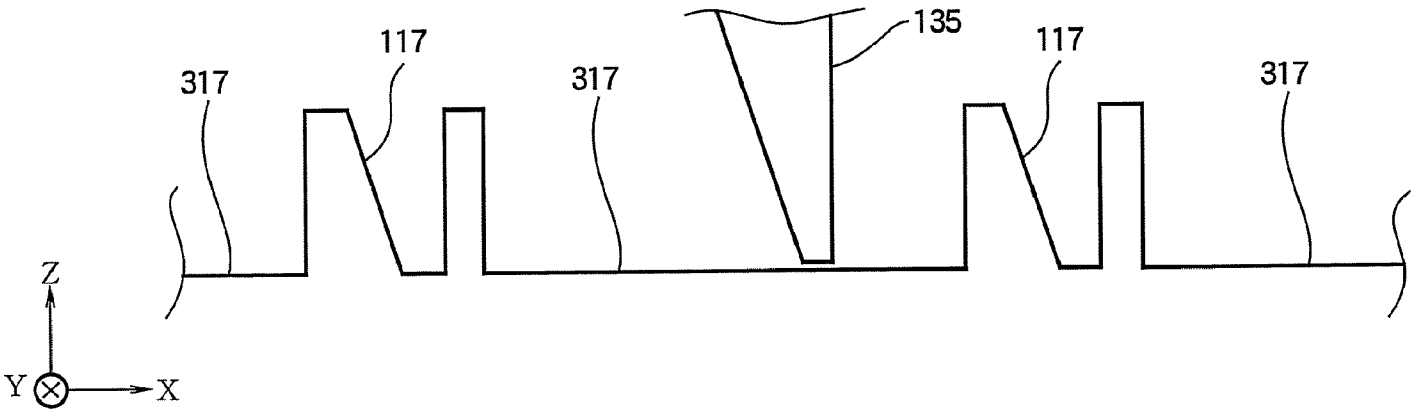
FIG. 17A shows a relationship among the claw portion, the first groove and the fourth groove when irregular-sized recording media are set in the media cassette.
Figure 17B:
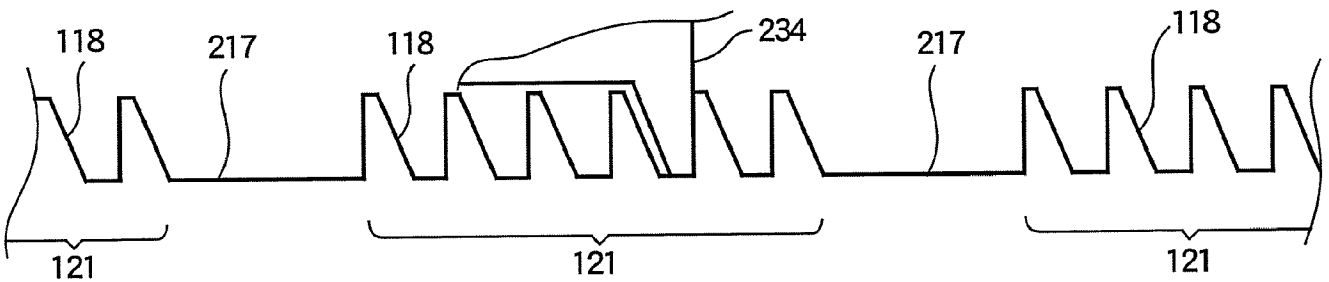
FIG. 17B shows a relationship among the claw portion, the second groove and the third groove when irregular-sized recording media are set in the media cassette.

FIG. 16A is a sectional view of a part in which the first grooves 117 and the fourth grooves 317 are formed, as seen from the negative side in the direction of the Y-axis. FIG. 16B is a sectional view of a part in which the second grooves 118 and the third grooves 217 are formed, as seen from the negative side in the direction of the Y-axis. The respective grooves of FIGS. 16A and 16B show the respective positions in the direction of the X-axis. FIGS. 17A and 17B are illustrated in the same way as FIGS. 16A and 16B.

In the case of setting the regular-sized recording media 11, the recording media 11 are stored in such a manner that the front ends of the recording media 11 abut against the media reference surface 120 (FIG. 15). In this state, the recording media 11 are guided by the pair of side guides 104 and 105 in the widthwise direction, and the recording media 11 are guided in a symmetrical manner with respect to the center in the widthwise direction (i.e., the direction of the Y-axis). Then, the tail guide 210 is moved to the position where the media regulating plate 131 of the tail guide 210 abuts against the rear ends of the recording media 11. In this state, the claw portion 135 (FIG. 15) of the tail guide 210 engages the first groove 117 formed on the cassette frame 101 so that the tail guide 210 is fixed.

As an alternative method, it is also possible to push the rear ends of the recording media 11 by the tail guide 210 to the position where the front ends of the recording media 11 abut against the media reference surface 120. In this case, the tail guide 210 is fixed at a position where the front ends of the recording media 11 abut against the media reference surface 120. As another alternative method, it is also possible to previously fix the tail guide 210 at a fixing position corresponding to the regular-sized recording media, and then set the recording media 11 to the position defined between the media reference surface 120 and the tail guide 210.

FIG. 16A shows the relationship among the claw portion 135, the first grooves 117 and the fourth grooves 317 in this state. FIG. 16B shows the relationship among the claw portion 234, the second grooves 118 and the third grooves 217 in this state. As shown in FIGS. 16A and 16B, the claw portion 135 engages the first groove 117, and the claw portion 234 enters into the third groove 217. The third groove 217 has the sufficient width to allow the claw portion 234 to freely move over the engaging position where the claw portion 135 engages the first groove 117 and the vicinity (frontward and rearward) of the engaging position. With such a configuration, during the setting of the regular-sized recording media 11, it is only necessary that the claw portion 135 engages the first groove 117 at one position, and therefore the operability of the tail guide 210 can be enhanced.

In the case of setting the irregular-sized recording media 11, the recording media 11 are stored in such a manner that the front ends of the recording media 11 abut against the media reference surface 120 (FIG. 15), as is the case with the regular-sized recording media. Then, the tail guide 210 is moved to the position (i.e., the contact position) where the media regulating plate 131 of the tail guide 210 abuts against the rear ends of the recording media 11, and the tail guide 210 is fixed at the closest position from the contact position.

FIG. 17A shows the relationship among the claw portion 135, the first grooves 117 and the fourth grooves 317 in this state. FIG. 17B shows the relationship among the claw portion 234, the second grooves 118 and the third grooves 217 in this state. As shown in FIGS. 17A and 17B, the claw portion 234 engages the second groove 118, and the claw portion 135 enters into the fourth groove 317. The fourth groove 317 has the sufficient width to allow the claw portion 135 to freely move when the claw portion 234 engages the second groove 118 (i.e., the groove-array 121). As described above, for the irregular-sized recording media 11, the claw portion 234 engages the second groove 118 of the groove-array 121 formed at narrow pitches, and therefore the accuracy in the fixing position can be enhanced. Furthermore, during the setting of the irregular-sized recording media 11, it is only necessary that the claw portion 234 engages the second groove 118 at one position, and therefore the operability of the tail guide 210 can be enhanced.

Moreover, as shown in FIGS. 16A through 17B, when the tail guide 210 is fixed, the claw portion 135 engages one of the first grooves 117 and the fourth grooves 317, and the claw portion 234 engages one of the second grooves 118 and the third grooves 217. Therefore, the deformation (distortion or the like) of the lock lever 233 of the tail guide 210 hardly occurs.

As described above, according to Embodiment 3, the tail guide can be fixed by means of the engagement between the claw portion and the groove at one position, and therefore the operability of the tail guide can be enhanced. Further, during the setting of the regular-sized recording media, the tail guide is in the free-state at positions ahead of and behind the fixing position, and therefore it becomes easy to confirm the tail guide being fixed at the position for the regular-sized recording media. Furthermore, during the setting of the irregular-sized recording media, the tail guide can be fixed with a high positioning accuracy. Moreover, when the tail guide is fixed, the deformation (distortion or the like) of the lock lever of the tail guide hardly occurs, and therefore the operability can be further enhanced.

Embodiment 4

Figure 18:
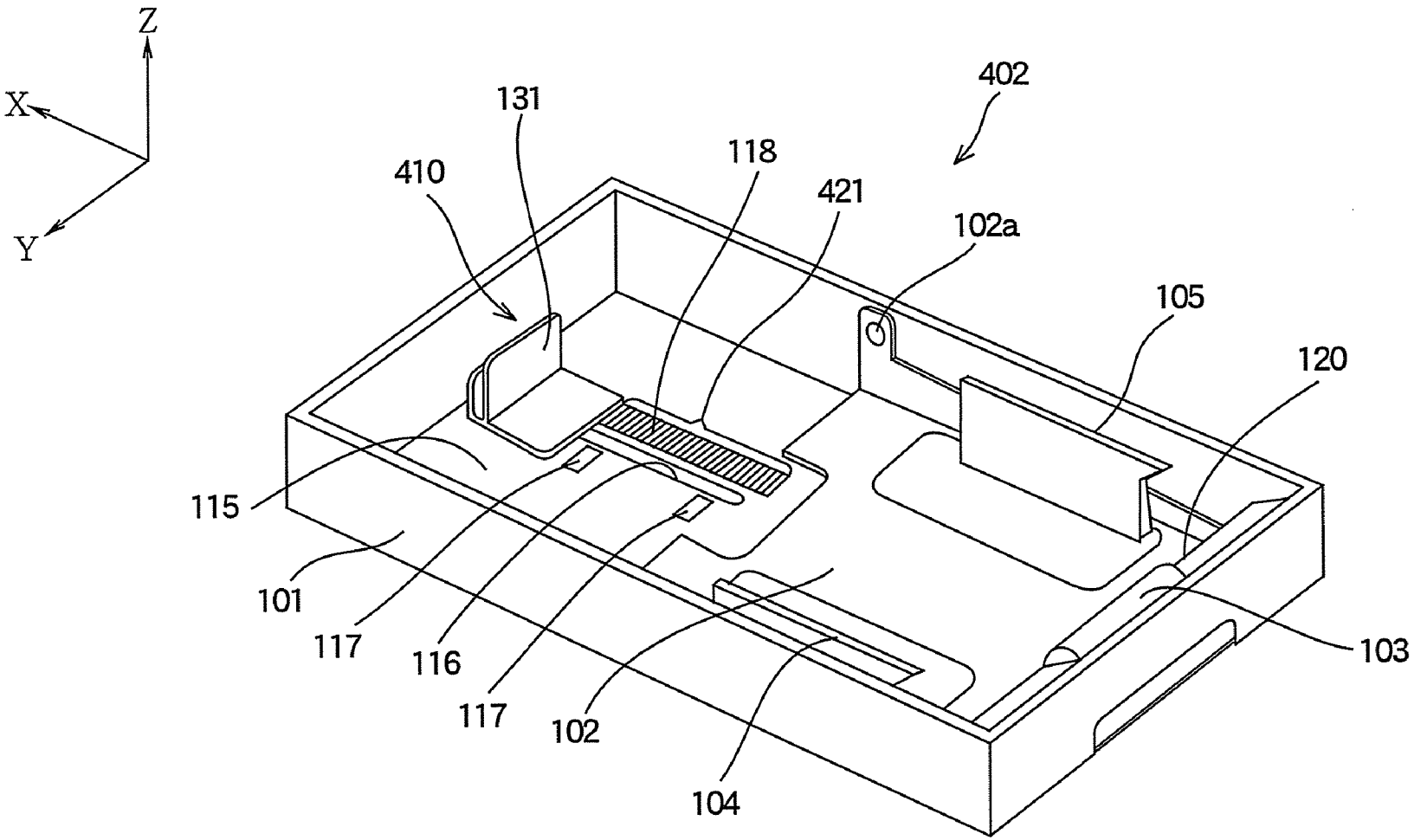
FIG. 18 is a perspective view showing a configuration of a media cassette as a media storage apparatus according to Embodiment 4 of the present invention.
Figure 19:
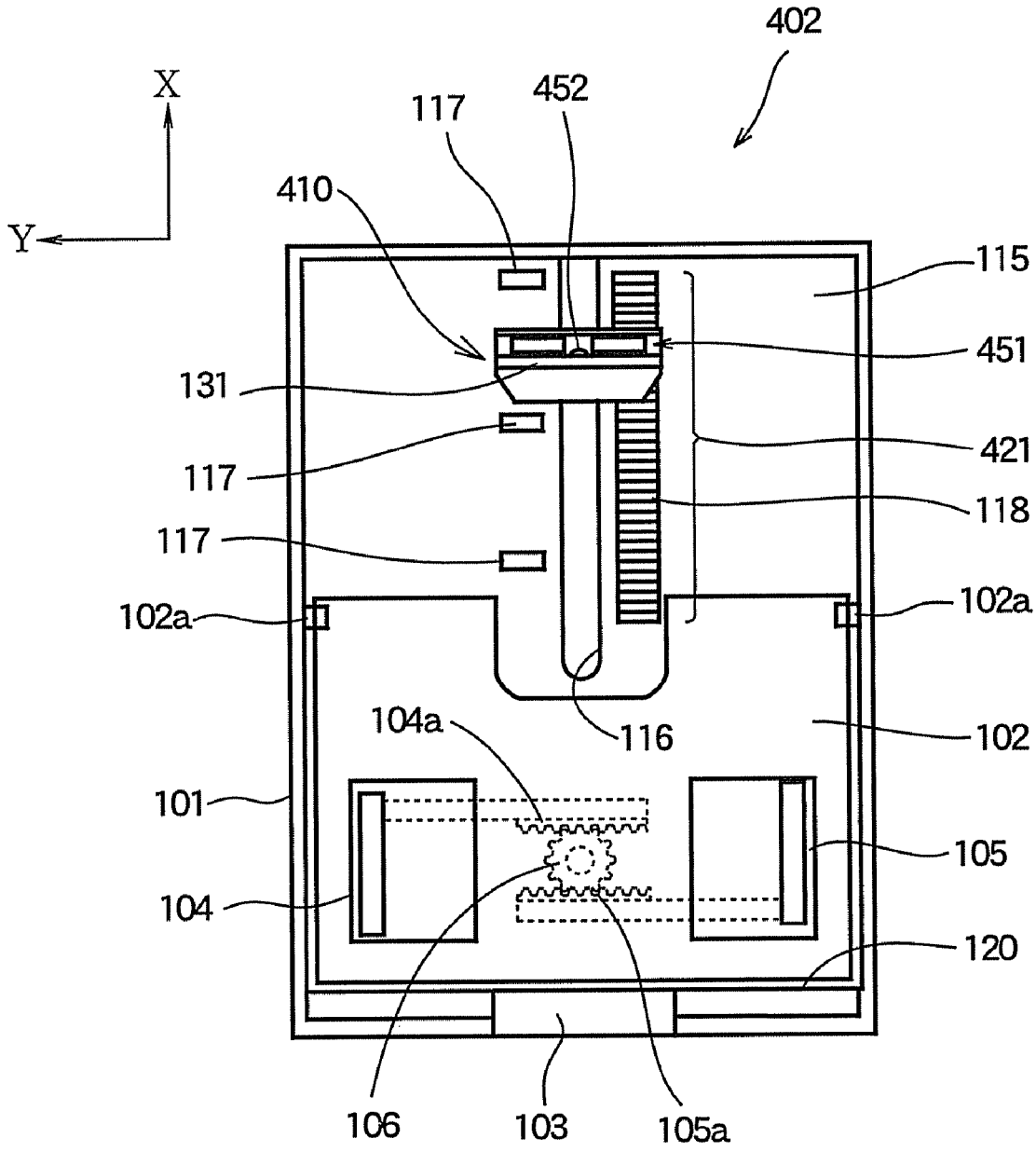
FIG. 19 is a plan view showing a configuration of the media cassette according to Embodiment 4 of the present invention.

FIGS. 18 and 19 are respectively a perspective view and a plan view showing a configuration of a media cassette as a media storage apparatus according to Embodiment 4 of the present invention.

The media cassette 402 according to Embodiment 4 is mainly different from the above described media cassette 2 according to Embodiment 1 (FIG. 2) in the shapes of the grooves formed on the bottom plate 115 and the structure of the tail guide 410 (in contrast with the tail guide 110 of Embodiment 1). Elements of the media cassette 402 that are the same as those of the media cassette 2 of Embodiment 1 are assigned the same reference numerals, and duplicate explanation will be omitted. The description will be emphasized on the difference between the media cassette 402 and the media cassette 2. The main body of the image forming apparatus to which the media cassette 402 is attached is the same as the main body (i.e., except the media cassette 2) of the image forming apparatus 1 shown in FIG. 1, and therefore duplicate explanation will be omitted.

The tail guide 410 and a holding mechanism thereof will be described. The tail guide 410 is provided for guiding the position of the recording media 11 set in the media cassette 402 in the longitudinal direction (i.e., the direction of the X-axis).

A movement-guide elongated hole 116 is formed on the bottom plate 115 of the cassette frame 101, and extends from the rear end to the center in the feeding direction of the recording media 11. First grooves 117 and second grooves 118 having different shapes are formed on the bottom plate 115. The first grooves 117 are formed on one side of the movement-guide elongated hole 116. The second grooves 118 are formed on the other side of the movement-guide elongated hole 116. The shapes of the first grooves 117 and the second grooves 118 are as described in Embodiment 1. The opening area of each first groove 117 is larger than the opening area of each second groove 118, and the depth of each first groove 117 is deeper than the depth of each second groove 118.

A side wall formed on the separation frame 103 side of the cassette frame 101 in the longitudinal direction (i.e., the direction of the X-axis) constitutes a media reference surface 120 against which the front ends of the recording media 11 abut. The first grooves 117 are disposed at predetermined distances from the media reference surface 120. The second grooves 118 are continuously formed at predetermined intervals and form groove-arrays 421.

Figure 20:
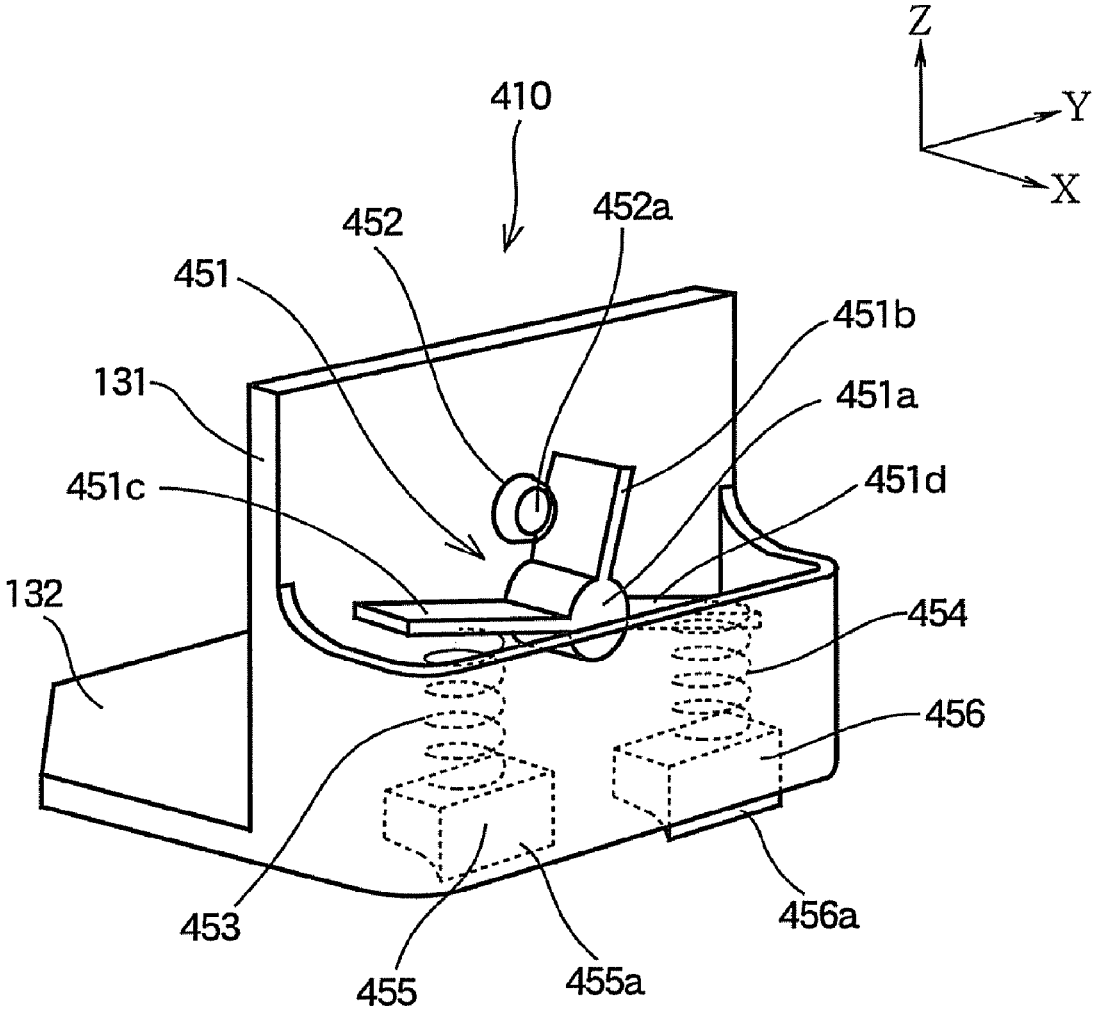
FIG. 20 is a perspective view showing an external shape of a tail guide according to Embodiment 4.

FIG. 20 is a perspective view showing the external shape of the tail guide 410. As shown in FIG. 20, the tail guide 410 includes a sliding member 455 and a sliding member 456 both of which are slidable in the vertical direction. The sliding member 455 has a claw portion 455a formed on the bottom thereof, and the sliding member 456 has a claw portion 456a formed on the bottom thereof. The sliding members 455 and 456 are adjacent to each other, and supported by not shown guiding units so that the sliding members 455 and 456 are slidable in the vertical direction (i.e., the direction of the Z-axis) Further, a movable member (lever) 451 is supported by the tail guide 410 so that the movable member 451 is rotatable about the rotation axis parallel to the X-axis. The movable member 451 has a shaft portion 451a, operation arms 451c and 451d projecting from the shaft portion 451a in the opposite directions, and a lock arm 451b extending from the shaft portion 451a in the direction perpendicular to the operation arms 451c and 451d.

A coil spring 453 is provided between the operation arm 451c and the sliding member 455. A coil spring 454 is provided between the operation arm 451d and the sliding member 456. A protrusion 452 is provided on the media regulating plate 131. The protrusion 452 has a spherical portion with a flat end 452a. The protrusion 452 is pushed in the positive direction along X-axis by a not shown pushing unit so that the spherical portion (having the flat end 452a) protrudes from the backside of the media regulating plate 131 to the position where the protrusion 452 contacts the lock arm 451b. Further movement of the protrusion 452 in the direction of the X-axis is restricted. The other configuration (i.e., the suspended portion 136 (FIG. 4) or the like) of the tail guide 410 is the same as the tail guide 110 (FIG. 4) described in Embodiment 1, and therefore duplicate explanation will be omitted.

The tail guide 410 is guided by the movement-guide elongated hole 116 formed on the cassette frame 101 and becomes slidably movable in the longitudinal direction thereof (i.e., the direction of X-axis). In this state, as described later, the claw portion 455a of the sliding member 455 of the tail guide 410 engages the second groove 118, or the claw portion 456a of the sliding member 456 of the tail guide 410 engages the first groove 117, so that the tail guide 410 is fixed. Hereinafter, the fixing operation will be described with reference to FIGS. 21A through 21C.

Figure 21A:
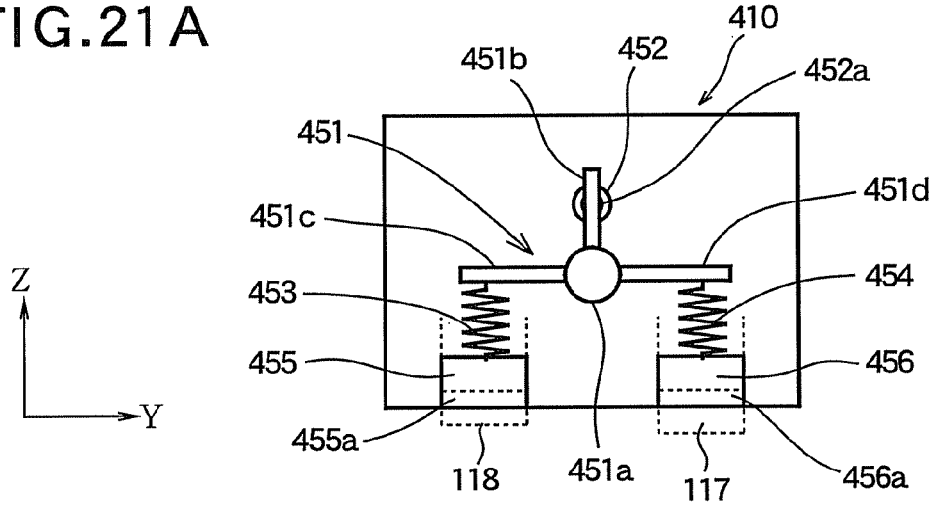
FIGS. 21A through 21C are schematic views for illustrating the operation of the tail guide according to Embodiment 4.
Figure 21B:
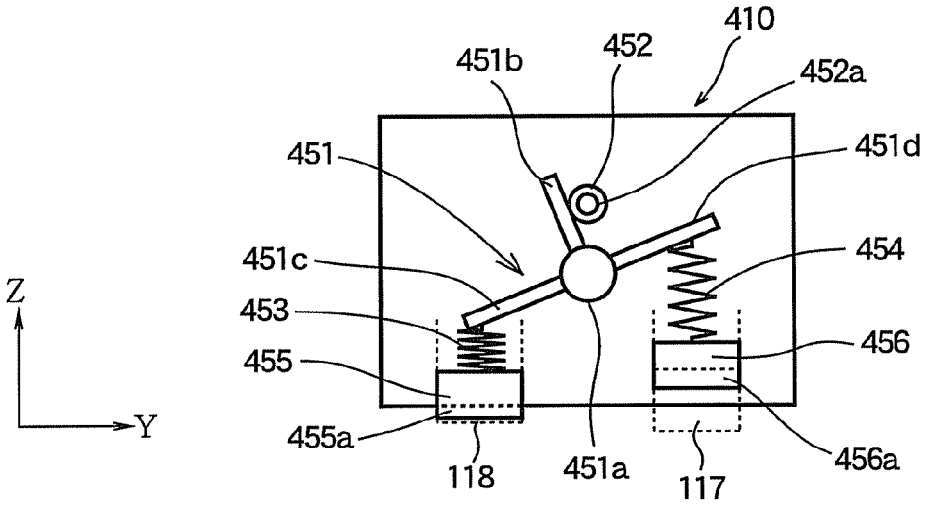
Figure 21C:
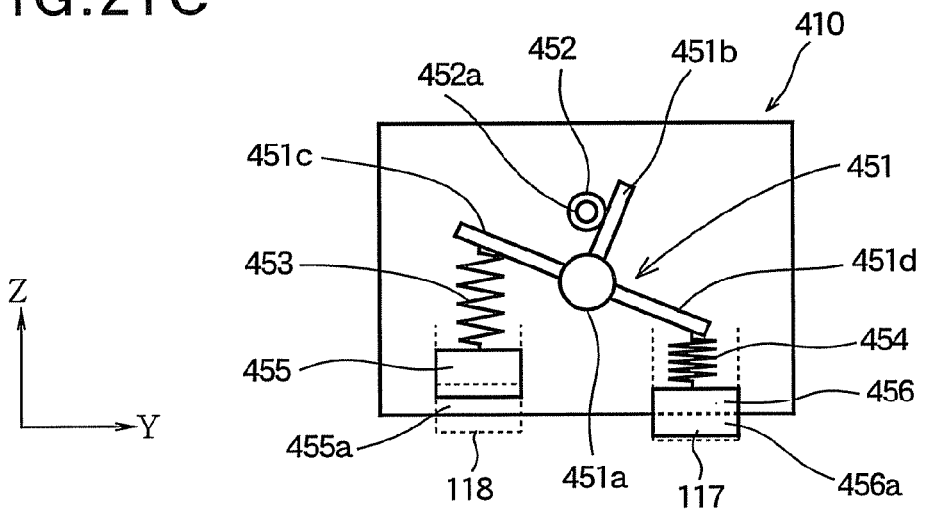

FIGS. 21A through 21C are schematic views illustrating the operation for fixing the tail guide 410. As shown in FIG. 21A, when the movable member 451 is in a neutral position (i.e., upright position) where the lock arm 451b contacts the flat end 452a and pushes in the protrusion 452, both of the claw portion 455a of the sliding member 455 and the claw portion 456a of the sliding member 456 are retracted in the tail guide 410. In this state, the tail guide 410 can freely move along the movement-guide elongated hole 116.

When the movable member 451 is rotated counterclockwise from the state shown in FIG. 21A to a position where the lock arm 451b is inclined at a predetermined angle to the left as shown in FIG. 21B, the protrusion 452 protrudes and regulates the clockwise rotation of the movable member 451. In this state, the operation arm 451c pushes the coil spring 453 downward, and the coil spring 453 (in a compressed state) pushes the sliding member 455 downward. With this, the claw portion 455a of the sliding member 455 protrudes downward, and becomes engagable with the second grooves 118. In contrast, the sliding member 456 is pushed upward by the coil spring 454 (in an expanded state).

In this regard, it is preferable to restrict a further downward movement of the sliding member 455 using a restricting unit (not shown). The respective strengths of the coil spring 453 and the pushing unit (not shown) of the protrusion 452 are so set that the clockwise rotation of the lock arm 451b of the movable member 451 is prevented by the protrusion 452 (pushed by the not shown pushing unit) when the lock arm 451b is pushed by the counterforce of the coil spring 453, and that the rotation of the movable member 451 is allowed when the user manually rotates the movable member 451 to the neutral position (FIG. 21A).

Similarly, when the movable member 451 is rotated clockwise from the state shown in FIG. 21A or FIG. 21B to a position where the lock arm 451b is inclined at a predetermined angle to the right as shown in FIG. 21C, the protrusion 452 protrudes and regulates the counterclockwise rotation of the movable member 451. In this state, the operation arm 451d pushes the coil spring 454 downward, and the coil spring 454 (in a compressed state) pushes the sliding member 456 downward. With this, the claw portion 456a of the sliding member 456 protrudes downward, and becomes engagable with the first grooves 117. In contrast, the sliding member 455 is pushed upward by the coil spring 453 (in an expanded state).

In this regard, it is preferable to restrict a further downward movement of the sliding member 456 using a restricting unit (not shown) The respective strengths of the coil spring 454 and the pushing unit (not shown) of the protrusion 452 are so set that the counterclockwise rotation of the lock arm 451b of the movable member 451 is prevented by the protrusion 452 (pushed by the not shown pushing unit) when the lock arm 451b of the movable member 451 is pushed by the counterforce of the coil spring 454, and that the rotation of the movable member 451 is allowed when the user manually rotates the movable member 451 to the neutral position (FIG. 21A).

The respective protruding amounts of the claw portions 455a and 456a are set according to the depths of the second grooves 118 and the first grooves 117 which the claw portions 455a and 456a respectively engage. The protruding amount of the claw portion 456a is larger than the protruding amount of the claw portion 455a. The movable member 451, the protrusion 452, the coil springs 453 and 454 and the like constitute a switching mechanism of the claw portions 455a and 456a.

The positions of the first grooves 117 are so determined that the distance from the medium reference surface 120 to the medium regulation plate 131 of the tail guide 410 is, for example, the same as or slightly longer than the longer sides of the regular-sized recording media 11 (such as A3, A4, A5, B5 or the like of Japan Industrial Standard) so that the regular-sized recording media 11 can be suitably set, when the claw portion 456a of the sliding member 456 engage the above described first groove 117 and is locked. In the groove-arrays 421, the second grooves 118 are formed at narrower pitches than the first grooves 117.

Next, the operation of the tail guide 410 in the case of setting the recording media 11 in the media cassette 302 will be described with reference to FIGS. 21A through 21C.

In the case of setting the regular-sized recording media 11, the recording media 11 are stored in such a manner that the front ends of the recording media 11 abut against the media reference surface 120 (FIG. 15). In this state, the recording media 11 are guided by the pair of side guides 104 and 105 in the widthwise direction, and the recording media 11 are guided in a symmetrical manner with respect to the center in the widthwise direction (i.e., the direction of the Y-axis). Then, the tail guide 410 is moved to the position where the media regulating plate 131 of the tail guide 410 abuts against the rear ends of the recording media 11. During the movement of the tail guide 410, the movable member 451 of the tail guide 400 is held at the neutral position (FIG. 21A). After the movement, when the tail guide 410 reaches the position where the claw portion 456a is able to engage the first groove 117 of the cassette frame 101, the movable member 451 is rotated clockwise to the right inclined position shown in FIG. 21C so that the claw portion 456a engages the first groove 117 to fix the tail guide 410.

As an alternative method, it is also possible to push the rear ends of the recording media 11 by the tail guide 410 to the position where the front ends of the recording media 11 abut against the media reference surface 120. In this case, the tail guide 410 is fixed at a position where the front ends of the recording media 11 abut against the media reference surface 120. As another alternative method, it is also possible to previously fix the tail guide 410 at a fixing position corresponding to the regular-sized recording media, and then set the recording media 11 to a position defined between the media reference surface 120 and the tail guide 410.

In the case of setting the irregular-sized recording media 11, the recording media 11 are stored in such a manner that the front ends of the recording media 11 abut against the media reference surface 120 (FIG. 15), as is the case with the regular-sized recording media. Then, the tail guide 410 is moved to the position (i.e., the contact position) where the media regulating plate 131 of the tail guide 410 abuts against the rear ends of the recording media 11, and the tail guide 410 is fixed at the closest position from the contact position. During the movement of the tail guide 410, the movable member 451 of the tail guide 400 is held at the neutral position (FIG. 21A). After the movement, the movable member 451 is rotated counterclockwise to the left inclined position shown in FIG. 21B so that the claw portion 455a engages the second groove 118 to fix the tail guide 410. For the irregular-sized recording media, the claw portion 455a engages the second grooves 118 of the groove-arrays 421 formed at narrow pitches, and therefore the accuracy in the fixing position can be enhanced.

With such a configuration, the tail guide 410 can be fixed to the cassette frame 101 by means of the engagement between the claw portion and the groove at one position, in either case of setting the regular-sized recording media 11 and setting the irregular-sized recording media 11.

In this Embodiment 4, the first grooves 117 and the second grooves 118 whose shapes are different from each other are formed on both sides of the movement-guide elongated hole 116. However, it is also possible that the shapes (i.e., the opening areas and depths) of the first grooves 117 and the second grooves 118 are the same as each other.

As described above, according to Embodiment 4, the tail guide can be fixed by means of the engagement between the claw portion and the groove at one position, and therefore the operability of the tail guide can be enhanced. Further, when one of two sliding members (provided adjacent to each other) engages the groove, the other of the sliding members is surely retracted in the tail guide, and therefore the fixing operation can be surely performed.

In the above described embodiments, the media storage apparatus and the image forming apparatus according to the present invention are applied to the electrophotographic printer. However, the present invention can also be applied to an MFP (Multi Function Printer), a facsimile, or a copier. Further, the present invention can also be applied to a two-stage tray or a multistage tray.

While the preferred embodiments of the present invention have been illustrated in detail, it should be apparent that modifications and improvements may be made to the invention without departing from the spirit and scope of the invention as described in the following claims.

What is claimed is:

1. A media storage apparatus comprising:

a media storing body that stores recording media;

a guide member slidably provided in said media storing body, said guide member guiding said recording media;

a first positioning groove formed on said media storing body for positioning said guide member at a predetermined position where said guide member guides regular-sized recording media, and a second positioning groove formed on said media storing body for positioning said guide member at a position where said guide member guides irregular-sized recording media, wherein said first positioning groove and said second positioning groove are different from each other in *both* depth[,] *and* opening area[or both].

2. The media storage apparatus according to claim 1, wherein said guide member has a claw portion, and wherein said first positioning groove and said second positioning groove are engagable with said claw portion.

3. The media storage apparatus according to claim 1, wherein a flat portion is formed between said first positioning groove and said second positioning groove.

4. The media storage apparatus according to claim 3, wherein a plurality of *said* second positioning grooves are arranged on [a] *the* same [array in a slidable] *row along a sliding* direction of said guide member;

wherein said first positioning groove[, said plurality of second positioning grooves] and said flat portion are arranged on the same [array in] *row as* said [slidable] *plurality of said second positioning grooves along said sliding* direction of said guide member, and wherein a width of said flat portion in said [slidable] *sliding* direction of said guide member is wider than a width of a portion between edges of *adjacent* two [of said plurality of] second positioning grooves *of said plurality of said second positioning grooves*.

5. The medium storage apparatus according to claim 4, further comprising a [movement-guide] *guide* hole having an elongated shape and formed [in the media storage] *on said media storing* body for guiding said guide member in said [slidable] *sliding* direction[of said guide member], wherein said [movement-guide] *guide* hole is not connected to said first positioning groove, and is not connected to said plurality of [second] *said second* positioning grooves.

6. The media storage apparatus according to claim 1, wherein said guide member [includes] *comprises*:

a first claw portion [engagable] *engageable* with said first positioning groove, and a second claw portion [engagable] *engageable* with said second positioning groove.

7. The media storage apparatus according to claim 6, further comprising a first engaging groove that engages said second claw portion when said first claw portion engages said first positioning groove.

8. The media storage apparatus according to claim 7, wherein said first engaging groove engages said second claw portion when said guide member moves over an engaging position where said first claw portion engages said first positioning groove and a predetermined area in [a] *the* vicinity of said engaging position.

9. The media storage apparatus according to claim 7, further comprising a second engaging groove that engages said first claw portion when said second claw portion engages said second positioning groove.

10. The media storage apparatus according to claim 9, wherein said second engaging groove engages said first claw portion when said guide member moves over an engaging position where said second claw portion engages said second positioning groove and a predetermined area in [a] *the* vicinity of said engaging position.

11. The media storage apparatus according to claim 1, wherein *a depth of* said first positioning groove [has a] *is* deeper *than a* depth *of said second positioning groove,* or [a larger]

*wherein an opening area of said first positioning groove is wider than an* opening area [than] *of* said second positioning groove.

12. The media storage apparatus according to claim 1, further [comprising:

a movement-guide hole formed in the ]*comprising a guide hole formed on said* media storing body, [and wherein the] *said* guide member [is adapted to slidably move along the movement-guide hole,] *being slidable along said guide hole;* wherein [the] *said* first positioning groove is [formed] *located* on a first side *with respect to said guide hole, and*

[portion of the movement-guide hole, and the] *wherein said* second positioning groove is [formed] *located* on a second side [portion of the movement-guide hole] *with respect to said guide hole*.

13. The media storage apparatus according to claim 12, wherein [the first side portion and the second side portion are on a first side of the movement-guide] *said first side and said second side are on the same side with respect to said guide* hole.

14. The media storage apparatus according to claim 12, wherein [the first side portion is on a first side of the movement-guide hole, and the second side portion is on a second side of the movement-guide hole opposite the first side] *said first side and said second side are opposite to each other with respect to said guide hole.*

15. The media storage apparatus according to claim 12, wherein said guide member [includes] *comprises*:

a first claw portion [engagable] *engageable* with said first positioning groove, and a second claw portion [engagable] *engageable* with said second positioning groove, wherein [the] *said* first claw portion and *said* second claw portion are different [sizes] *from each other in size.*

16. A media storage apparatus comprising:

a media storing body that stores recording media;

a guide member slidably provided in said media storing body, said guide member guiding said recording media;

a first positioning groove formed on said media storing body for positioning said guide member at a predetermined position where said guide member guides regular-sized recording media, and a second positioning groove formed on said media storing body for positioning said guide member at a position where said guide member guides irregular-sized recording media, wherein said guide member [includes] *comprises*:

a first claw portion [that engages] *engageable with* said first positioning groove;

a second claw portion [that engages] *engageable with* said second positioning groove, and a switching mechanism that selectively causes one of said first and second claw portions to engage [a] corresponding one of said first and second positioning grooves, *and* wherein said first positioning groove and said second positioning groove are different from each other in [depth, opening area or] both *depth and opening area.*

17. The media storage apparatus according to claim 16, wherein [said first positioning groove has a deeper depth or a larger opening area than said] *a depth of said first positioning groove is deeper than a depth of said second positioning groove, or*

*wherein an opening area of said first positioning groove is wider than an opening area of said* second positioning groove.

18. The media storage apparatus according to claim 16, further [comprising: a movement-guide hole formed in the] *comprising a guide hole formed on said* media storing body, [and wherein the] *said* guide member [is adapted to slidably move along the movement-guide hole,] *being slidable along said guide hole;* wherein [the] *said* first positioning groove is [formed] *located* on a first side *with respect to said guide hole, and*

[portion of the movement-guide hole, and the] *wherein said* second positioning groove is [formed] *located* on a second side [portion of the movement-guide hole] *with respect to said guide hole.*

19. The media storage apparatus according to claim 18, wherein [the first side portion and the second side portion are on a first side of the movement-guide] *said first side and said second side are on the same side with respect to said guide* hole.

20. The media storage apparatus according to claim 18, wherein [the first side portion is on a first side of the movement-guide hole, and the second side portion is on a second side of the movement-guide hole opposite the first side] *said first side and said second side are opposite to each other with respect to said guide hole.*

21. An image forming apparatus comprising:

said media storage apparatus according to claim 1;

an image forming portion that forms a developer image;

a transfer portion that transfers said developer image to said recording medium fed from said media storage apparatus, and a fixing portion that fixes said developer image to said recording medium.

22. An image forming apparatus comprising:

said media storage apparatus according to claim 16;

an image forming portion that forms a developer image;

a [transferring] *transfer* portion that transfers said developer image to said recording medium fed from said media [storing portion] *storage apparatus*, and a fixing portion that fixes said developer image to said recording medium.

*23. A media storage apparatus, comprising:*

*a media storing body that stores recording media;*

*a guide member slidably provided in said media storing body, said guide member guiding said recording media;*

*a first positioning groove formed on said media storing body for positioning said guide member at a predetermined position where said guide member guides regular-sized recording media, and*

*a second positioning groove formed on said media storing body for positioning said guide member at a position where said guide member guides irregular-sized recording media,*

*wherein said first positioning groove and said second positioning groove are different from each other in shape, and*

*wherein said first positioning groove and said second positioning groove are arranged on the same row along a sliding direction of said guide member.*

*24. The media storage apparatus according to claim 23, wherein said first positioning groove and said second positioning groove are different from each other in depth.*

*25. The media storage apparatus according to claim 23, wherein said first positioning groove and said second positioning groove are different from each other in opening area.*

*26. The media storage apparatus according to claim 23, wherein said first positioning groove and said second positioning groove are different from each other in both depth and opening area.*

*27. The media storage apparatus according to claim 23, wherein a flat portion is formed between said first positioning groove and said second positioning groove,*

*a plurality of said second positioning grooves are arranged on the same row along a sliding direction of said guide member;*

*wherein said first positioning groove and said flat portion are arranged on the same row as said plurality of said second positioning grooves along said sliding direction of said guide member, and*

*wherein a width of said flat portion in said sliding direction of said guide member is wider than a width of a portion between edges of adjacent two second positioning grooves of said plurality of said second positioning grooves.*

*28. An image forming apparatus, comprising:*

*said media storage apparatus according to claim 23;*

*an image forming portion that forms a developer image;*

*a transfer portion that transfers said developer image to said recording medium fed from said media storage apparatus, and*

*a fixing portion that fixes said developer image to said recording medium.*

* * * * *